US007631346B2

(12) United States Patent
Hinton et al.

(10) Patent No.: US 7,631,346 B2
(45) Date of Patent: Dec. 8, 2009

(54) METHOD AND SYSTEM FOR A RUNTIME USER ACCOUNT CREATION OPERATION WITHIN A SINGLE-SIGN-ON PROCESS IN A FEDERATED COMPUTING ENVIRONMENT

(75) Inventors: Heather Maria Hinton, Austin, TX (US); Ivan Matthew Milman, Austin, TX (US); Venkat Raghavan, Austin, TX (US); Shane Bradley Weeden, Gold Coast (AU)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 11/097,587

(22) Filed: Apr. 1, 2005

(65) Prior Publication Data

US 2006/0236382 A1    Oct. 19, 2006

(51) Int. Cl.
*G06F 7/04* (2006.01)
*G06F 15/16* (2006.01)
*G04L 9/32* (2006.01)
*G06F 17/30* (2006.01)

(52) U.S. Cl. .......................................... 726/8; 380/279
(58) Field of Classification Search .................. 726/6, 726/5, 4, 8; 709/223, 229, 219; 713/202, 713/186, 169; 380/279; 715/500
See application file for complete search history.

(56) References Cited

U.S. PATENT DOCUMENTS

| 7,290,278 | B2* | 10/2007 | Cahill et al. .................... 726/6 |
| 2003/0149781 | A1 | 8/2003 | Yared et al. |
| 2003/0154266 | A1* | 8/2003 | Bobick et al. ................ 709/223 |
| 2004/0010607 | A1* | 1/2004 | Lee et al. ..................... 709/229 |
| 2004/0158746 | A1* | 8/2004 | Hu et al. ...................... 713/202 |
| 2004/0205176 | A1* | 10/2004 | Ting et al. .................... 709/223 |
| 2005/0074126 | A1* | 4/2005 | Stanko ........................ 380/279 |
| 2005/0210270 | A1* | 9/2005 | Rohatgi et al. ............... 713/186 |
| 2005/0240763 | A9* | 10/2005 | Bhat et al. ................... 713/169 |
| 2005/0257130 | A1* | 11/2005 | Ito ............................ 715/500.1 |
| 2006/0048213 | A1* | 3/2006 | Cheng et al. .................... 726/5 |

(Continued)

OTHER PUBLICATIONS

Gross, T.; Security analysis of the SAML single sign-on browser/artifact profile; Publication Date: Dec. 8-12, 2003; IBM Zurich Res. Lab; On pp. 298-307.*

*Primary Examiner*—Kambiz Zand
*Assistant Examiner*—Monjour Rahim
(74) *Attorney, Agent, or Firm*—Jeffrey S. LaBaw; David H. Judson

(57) ABSTRACT

A method, system, apparatus, and computer program product are presented to support computing systems of different enterprises that interact within a federated computing environment. Federated single-sign-on operations can be initiated at the computing systems of federation partners on behalf of a user even though the user has not established a user account at a federation partner prior to the initiation of the single-sign-on operation. For example, an identity provider can initiate a single-sign-on operation at a service provider while attempting to obtain access to a controlled resource on behalf of a user. When the service provider recognizes that it does not have a linked user account for the user that allows for a single-sign-on operation with the identity provider, the service provider creates a local user account. The service provider can also pull user attributes from the identity provider as necessary to perform the user account creation operation.

20 Claims, 14 Drawing Sheets

U.S. PATENT DOCUMENTS

2006/0059544 A1* 3/2006 Guthrie et al. .................. 726/4
2006/0195893 A1* 8/2006 Caceres et al. .................. 726/8
2007/0005730 A1* 1/2007 Torvinen et al. ............ 709/219

* cited by examiner

TYPICAL SINGLE-SIGN-ON OPERATION
(INITIATED BY IDENTITY PROVIDER -- USER PREVIOUSLY PROVISIONED AT SP)

**PUSH-TYPE SINGLE-SIGN-ON OPERATION WITH RUNTIME USER ACCOUNT CREATION AT SP
(USER NOT PREVIOUSLY PROVISIONED AT SP)**

PUSH-TYPE SINGLE-SIGN-ON OPERATION WITH RUNTIME USER ACCOUNT CREATION AT SP
(ADDITIONAL PULLING OF USER ATTRIBUTES BY SP FROM IDP)

PUSH-TYPE SINGLE-SIGN-ON OPERATION WITH RUNTIME USER ACCOUNT CREATION AT SP
(ADDITIONAL PULLING OF USER ATTRIBUTES BY SP FROM IDP)

COMPLETION OF PUSH-TYPE SSO OPERATION WITH RUNTIME USER ACCOUNT CREATION AT SP
(FRONT-CHANNEL USER ATTRIBUTE RETRIEVAL BY SP FROM IDP)

COMPLETION OF PUSH-TYPE SSO OPERATION WITH RUNTIME USER ACCOUNT CREATION AT SP
(BACK-CHANNEL USER ATTRIBUTE RETRIEVAL BY SP FROM IDP)

PULL-TYPE SINGLE-SIGN-ON OPERATION WITH RUNTIME USER PROVISIONING AT SP
(USER NOT PREVIOUSLY PROVISIONED AT SP)

COMPLETION OF PULL-TYPE SSO OPERATION WITH RUNTIME USER ACCOUNT CREATION AT SP
(FRONT-CHANNEL USER ATTRIBUTE RETRIEVAL BY SP FROM IDP)

COMPLETION OF PULL-TYPE SSO OPERATION WITH RUNTIME USER ACCOUNT CREATION AT SP
(BACK-CHANNEL USER ATTRIBUTE RETRIEVAL BY SP FROM IDP)

METHOD AND SYSTEM FOR A RUNTIME USER ACCOUNT CREATION OPERATION WITHIN A SINGLE-SIGN-ON PROCESS IN A FEDERATED COMPUTING ENVIRONMENT

BACKGROUND OF THE INVENTION

1. Field of the Invention

The present invention relates to an improved data processing system and, in particular, to a method and apparatus for multicomputer data transferring. Still more particularly, the present invention is directed to networked computer systems.

2. Description of Related Art

Enterprises generally desire to provide authorized users with secure access to protected resources in a user-friendly manner throughout a variety of networks, including the Internet. Although providing secure authentication mechanisms reduces the risks of unauthorized access to protected resources, those authentication mechanisms may become barriers to accessing protected resources. Users generally desire the ability to change from interacting with one application to another application without regard to authentication barriers that protect each particular system supporting those applications.

As users get more sophisticated, they expect that computer systems coordinate their actions so that burdens on the user are reduced. These types of expectations also apply to authentication processes. A user might assume that once he or she has been authenticated by some computer system, the authentication should be valid throughout the user's working session, or at least for a particular period of time, without regard to the various computer architecture boundaries that are almost invisible to the user. Enterprises generally try to fulfill these expectations in the operational characteristics of their deployed systems, not only to placate users but also to increase user efficiency, whether the user efficiency is related to employee productivity or customer satisfaction.

More specifically, with the current computing environment in which many applications have a Web-based user interface that is accessible through a common browser, users expect more user-friendliness and low or infrequent barriers to movement from one Web-based application to another. In this context, users are coming to expect the ability to jump from interacting with an application on one Internet domain to another application on another domain without regard to the authentication barriers that protect each particular domain. However, even if many systems provide secure authentication through easy-to-use, Web-based interfaces, a user may still be forced to reckon with multiple authentication processes that stymie user access across a set of domains. Subjecting a user to multiple authentication processes in a given time frame may significantly affect the user's efficiency.

For example, various techniques have been used to reduce authentication burdens on users and computer system administrators. These techniques are generally described as "single-sign-on" (SSO) processes because they have a common purpose: after a user has completed a sign-on operation, i.e. been authenticated, the user is subsequently not required to perform another authentication operation. Hence, the goal is that the user would be required to complete only one authentication process during a particular user session.

To reduce the costs of user management and to improve interoperability among enterprises, federated computing spaces have been created. A federation is a loosely coupled affiliation of enterprises which adhere to certain standards of interoperability; the federation provides a mechanism for trust among those enterprises with respect to certain computational operations for the users within the federation. For example, a federation partner may act as a user's home domain or identity provider. Other partners within the same federation may rely on the user's identity provider for primary management of the user's authentication credentials, e.g., accepting a single-sign-on token that is provided by the user's identity provider.

As enterprises move to support federated business interactions, these enterprises should provide a user experience that reflects the increased cooperation between two businesses. As noted above, a user may authenticate to one party that acts as an identity provider and then single-sign-on to a federated business partner that acts as a service provider. In conjunction with single-sign-on functionality, additional user lifecycle functionality, such as single-sign-off, user provisioning, and account linking/delinking, should also be supported.

Single-sign-on solutions require that a user be identifiable in some form or another at both an identity provider and a service provider; the identity provider needs to be able to identify and authenticate a user, and the service provider needs to be able to identify the user based on some form of assertion about the user in response to a single-sign-on request. Various prior art single-sign-on solutions, e.g., such as those described in the Liberty Alliance ID-FF specifications, require that a user have an authenticatable account at both an identity provider and a service provider as a prerequisite to a federated single-sign-on operation. Some federated solutions support an a priori user account creation event across domains to be used to establish these accounts, thereby satisfying a requirement that a user have an authenticatable account at both an identity provider and a service provider as a prerequisite to a federated single-sign-on operation. Although some federated solutions provide a robust set of federated user lifecycle management operations, such as user account creation, user account management, user attribute management, account suspension, and account deletion, these federated management systems do not provide a lightweight solution that is suitable for certain federation partners or for certain federated purposes.

Therefore, it would be advantageous to have methods and systems in which enterprises can provide comprehensive single-sign-on experiences to users in a federated computing environment in a lightweight manner that does not require an extensive amount of a priori processing.

SUMMARY OF THE INVENTION

A method, system, apparatus, and computer program product are presented to support computing systems of different enterprises that interact within a federated computing environment. Federated single-sign-on operations can be initiated at the computing systems of federation partners on behalf of a user even though the user has not established a user account at a federation partner prior to the initiation of the single-sign-on operation. For example, an identity provider can initiate a single-sign-on operation at a service provider while attempting to obtain access to a controlled resource on behalf of a user. When the service provider recognizes that it does not have a linked user account for the user that allows a single-sign-on operation from the identity provider, the service provider creates a local user account based at least in part on information from the identity provider. The service provider can also pull user attributes from the identity provider as necessary to perform the user account creation operation.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
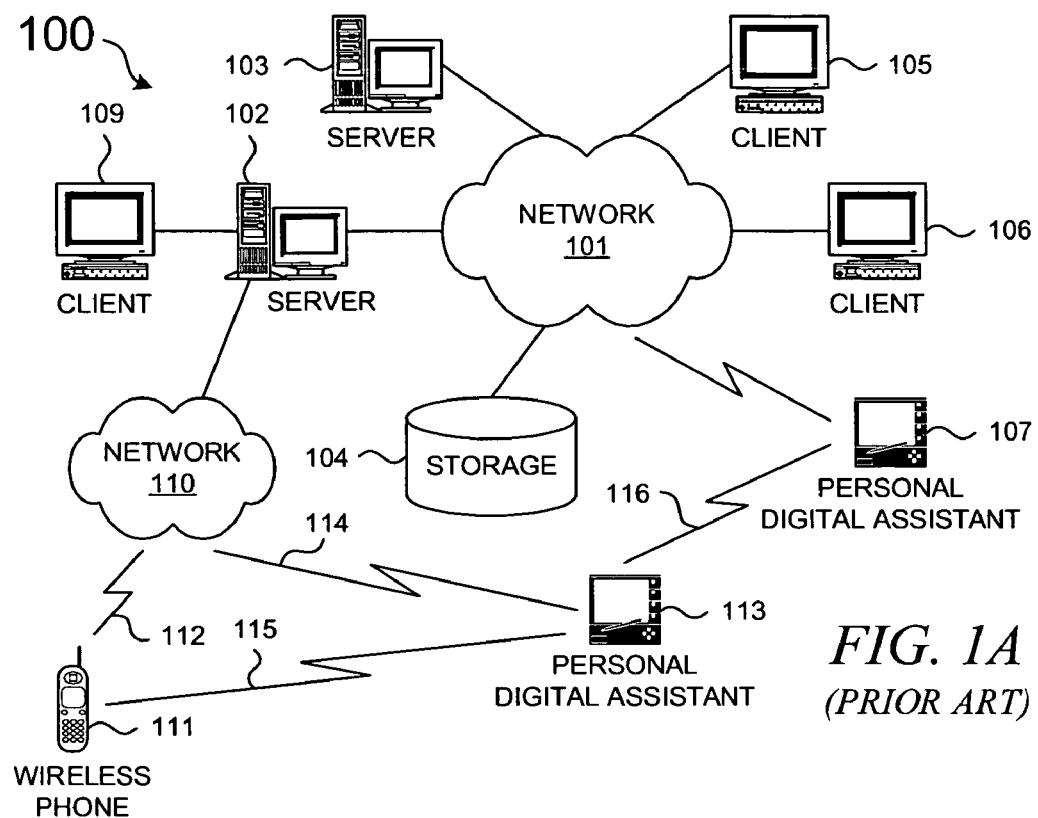
FIG. 1A depicts a typical network of data processing systems, each of which may implement the present invention.

With reference now to the figures, FIG. 1A depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as LDAP (Lightweight Directory Access Protocol), TCP/IP (Transport Control Protocol/Internet Protocol), HTTP (HyperText Transport Protocol), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks or personal ad-hoc networks. In a similar manner, PDA 113 can transfer data to PDA 107 via wireless communication link 116.

The present invention could be implemented on a variety of hardware platforms and software environments. FIG. 1A is intended as an example of a heterogeneous computing environment and not as an architectural limitation for the present invention.

Figure 1B:
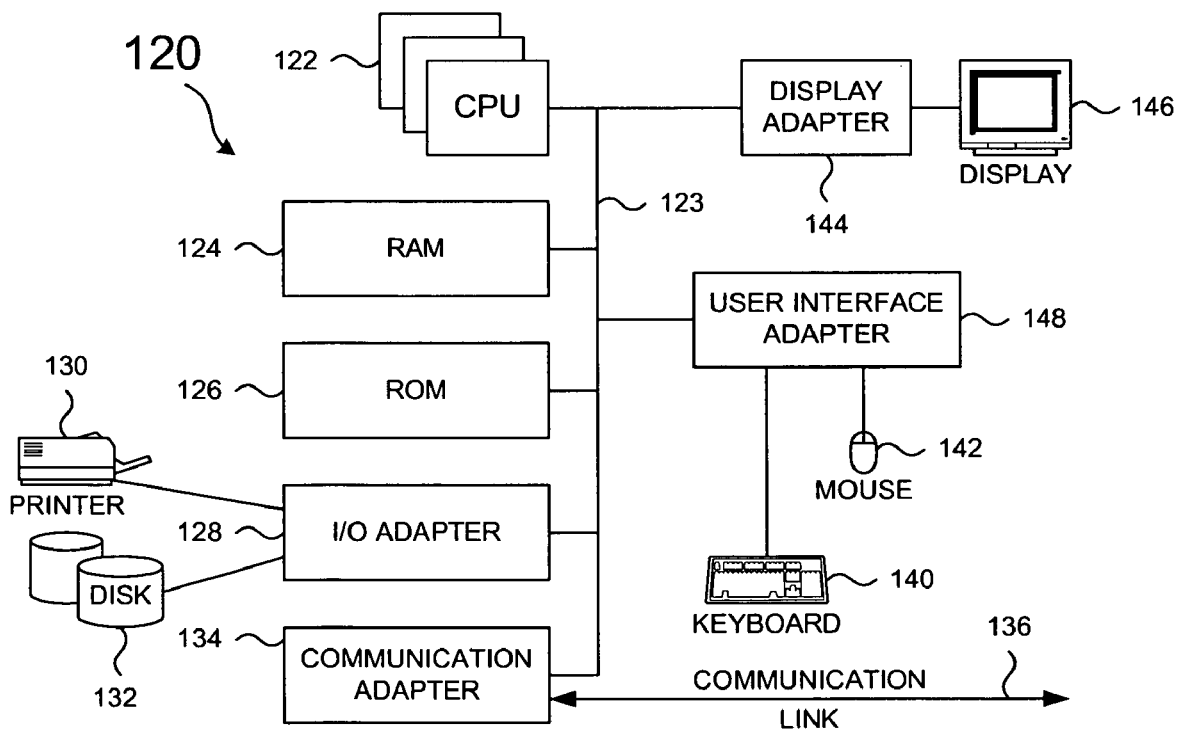
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files. It should also be noted that the distributed data processing system shown in FIG. 1A is contemplated as being fully able to support a variety of peer-to-peer subnets and peer-to-peer services.

Figure 1C:
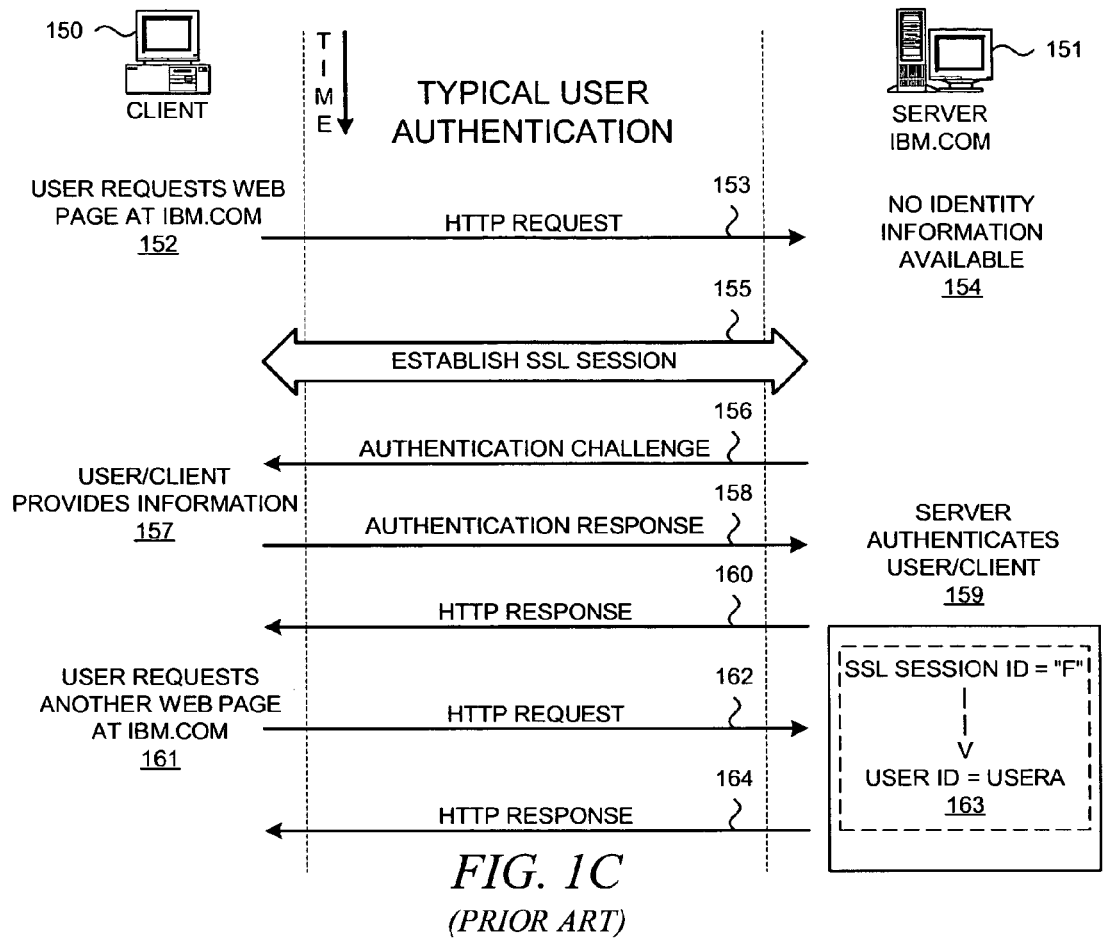
FIG. 1C depicts a data flow diagram that illustrates a typical authentication process that may be used when a client attempts to access a protected resource at a server.

With reference now to FIG. 1C, a data flow diagram illustrates a typical authentication process that may be used when a client attempts to access a protected resource at a server. As illustrated, the user at a client workstation 150 seeks access over a computer network to a protected resource on a server 151 through the user's web browser executing on the client workstation. A protected or controlled resource is a resource (an application, an object, a document, a page, a file, executable code, or other computational resource, communication-type resource, etc.) for which access is controlled or restricted. A protected resource is identified by a Uniform Resource Locator (URL), or more generally, a Uniform Resource Identifier (URI), that can only be accessed by an authenticated and/or authorized user. The computer network may be the Internet, an intranet, or other network, as shown in FIG. 1A or FIG. 1B, and the server may be a web application server (WAS), a server application, a servlet process, or the like.

The process is initiated when the user requests a server-side protected resource, such as a web page within the domain "ibm.com" (step 152). The terms "server-side" and "client-side" refer to actions or entities at a server or a client, respectively, within a networked environment. The web browser (or associated application or applet) generates an HTTP request (step 153) that is sent to the web server that is hosting the domain "ibm.com". The terms "request" and "response" should be understood to comprise data formatting that is appropriate for the transfer of information that is involved in a particular operation, such as messages, communication protocol information, or other associated information.

The server determines that it does not have an active session for the client (step 154), so the server initiates and completes the establishment of an SSL (Secure Sockets Layer) session between the server and the client (step 155), which entails multiple transfers of information between the client and the server. After an SSL session is established, subsequent communication messages are transferred within the SSL session; any secret information remains secure because of the encrypted communications within the SSL session.

However, the server needs to determine the identity of the user before allowing the user to have access to protected resources, so the server requires the user to perform an authentication process by sending the client some type of authentication challenge (step 156). The authentication challenge may be in various formats, such as an HTML form. The user then provides the requested or required information (step 157), such as a username or other type of user identifier along with an associated password or other form of secret information.

The authentication response information is sent to the server (step 158), at which point the server authenticates the user or client (step 159), e.g., by retrieving previously submitted registration information and matching the presented authentication information with the user's stored information. Assuming the authentication is successful, an active session is established for the authenticated user or client. The server creates a session identifier for the client, and any subsequent request messages from the client within the session would be accompanied by the session identifier.

The server then retrieves the originally requested web page and sends an HTTP response message to the client (step 160), thereby fulfilling the user's original request for the protected resource. At that point, the user may request another page within "ibm.com" (step 161) by clicking a hypertext link within a browser window, and the browser sends another HTTP request message to the server (step 162). At that point, the server recognizes that the user has an active session (step 163) because the user's session identifier is returned to the server in the HTTP request message, and the server sends the requested web page back to the client in another HTTP response message (step 164). Although FIG. 1C depicts a typical prior art process, it should be noted that other alternative session state management techniques may be depicted, such as URL rewriting or using cookies to identify users with active sessions, which may include using the same cookie that is used to provide proof of authentication.

Figure 1D:
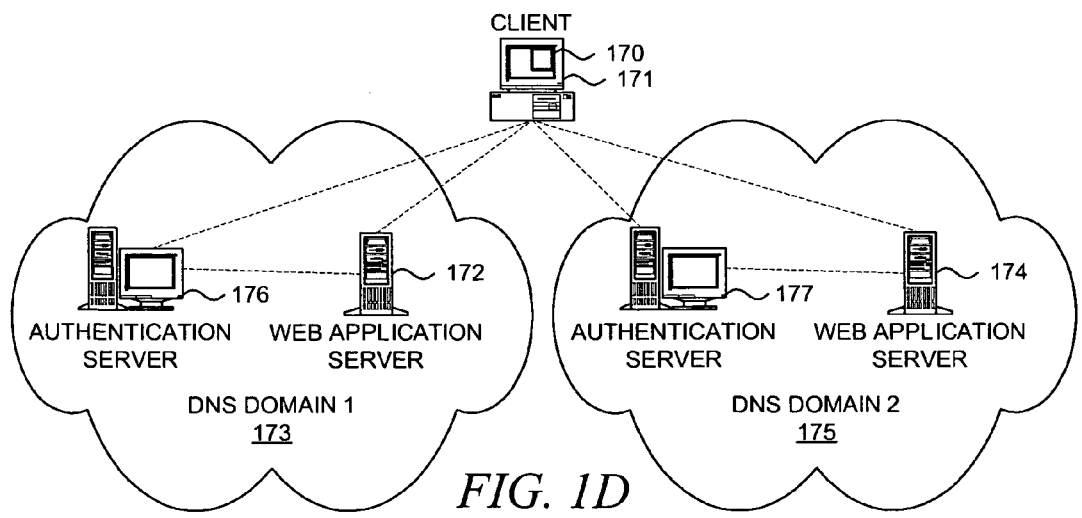
FIG. 1D depicts a network diagram that illustrates a typical Web-based environment in which the present invention may be implemented.

With reference now to FIG. 1D, a diagram illustrates a typical Web-based environment in which the present invention may be implemented. In this environment, a user of browser 170 at client 171 desires to access a protected resource on web application server 172 in DNS domain 173, or on web application server 174 in DNS domain 175.

In a manner similar to that shown in FIG. 1C, a user can request a protected resource at one of many domains. In contrast to FIG. 1C, which shows only a single server at a particular domain, each domain in FIG. 1D has multiple servers. In particular, each domain may have an associated authentication server 176 and 177.

In this example, after client 171 issues a request for a protected resource at domain 173, web application server 172 determines that it does not have an active session for client 171, and it requests that authentication server 176 perform an appropriate authentication operation with client 171. Authentication server 176 communicates the result of the authentication operation to web application server 172. If the user (or browser 170 or client 171 on behalf of the user) is successfully authenticated, then web application server 172 establishes a session for client 171 and returns the requested protected resource. Typically, once the user is authenticated by the authentication server, a cookie may be set and stored in a cookie cache in the browser. FIG. 1D is merely an example of one manner in which the processing resources of a domain may be shared amongst multiple servers, particularly to perform authentication operations.

In a similar manner, after client 171 issues a request for a protected resource at domain 175, authentication server 177 performs an appropriate authentication operation with client 171, after which web application server 174 establishes a session for client 171 and returns the requested protected resource. Hence, FIG. 1D illustrates that client 171 may have multiple concurrent sessions in different domains yet is required to complete multiple authentication operations to establish those concurrent sessions.

Figure 1E:
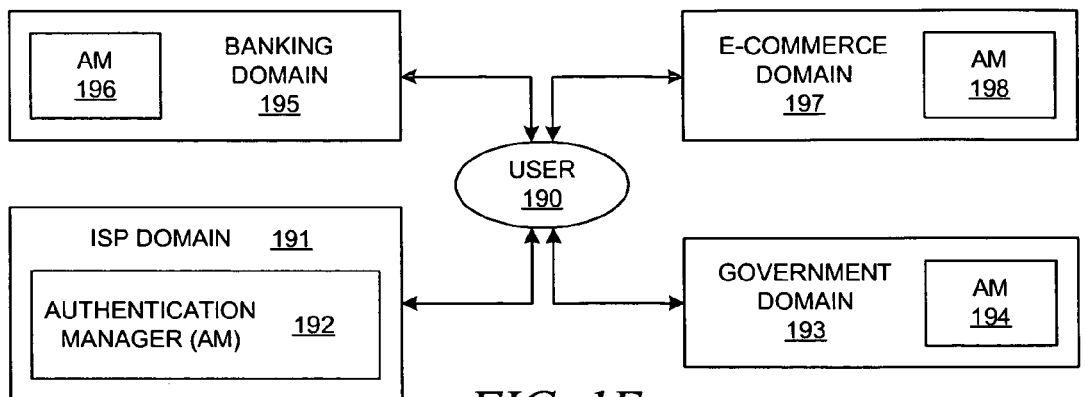
FIG. 1E depicts a block diagram that illustrates an example of a typical online transaction that might require multiple authentication operations from a user.

With reference now to FIG. 1E, a block diagram depicts an example of a typical online transaction that might require multiple authentication operations from a user. Referring again to FIG. 1C and FIG. 1D, a user may be required to complete an authentication operation prior to gaining access to a controlled resource, as shown in FIG. 1C. Although not shown in FIG. 1C, an authentication manager may be deployed on server 151 to retrieve and employ user information that is required to authenticate a user. As shown in FIG. 1D, a user may have multiple current sessions within different domains 173 and 175, and although they are not shown in FIG. 1D, each domain may employ an authentication manager in place of or in addition to the authentication servers. In a similar manner, FIG. 1E also depicts a set of domains, each of which support some type of authentication manager. FIG. 1E illustrates some of the difficulties that a user may experience when accessing multiple domains that require the user to complete an authentication operation for each domain.

User 190 may be registered at ISP domain 191, which may support authentication manager 192 that authenticates user 190 for the purpose of completing transactions with respect to domain 191. ISP domain 191 may be an Internet Service Provider (ISP) that provides Internet connection services, email services, and possibly other e-commerce services. Alternatively, ISP domain 191 may be an Internet portal that is frequently accessed by user 190.

Similarly, domains 193, 195, and 197 represent typical web service providers. Government domain 193 supports authentication manager 194 that authenticates users for completing various government-related transactions. Banking domain 195 supports authentication manager 196 that authenticates users for completing transactions with an online bank. E-commerce domain 197 supports authentication manager 198 that authenticates users for completing online purchases.

As noted previously, when a user attempts to move from one domain to another domain within the Internet or World Wide Web by accessing resources at the different domains, a user may be subjected to multiple user authentication requests or requirements, which can significantly slow the user's progress across a set of domains. Using FIG. 1E as an exemplary environment, user 190 may be involved in a complicated online transaction with e-commerce domain 197 in which the user is attempting to purchase an on-line service that is limited to users who are at least 18 years old and who have a valid driver license, a valid credit card, and a U.S. bank account. This online transaction may involve domains 191, 193, 195, and 197.

Typically, a user might not maintain an identity and/or attributes within each domain that participates in a typical online transaction. In this example, user 190 may have registered his or her identity with the user's ISP, but to complete the online transaction, the user might also be required to authenticate to domains 193, 195, and 197. If each of the domains does not maintain an identity for the user, then the user's online transaction may fail. Even if the user can be authenticated by each domain, it is not guaranteed that the different domains can transfer information between themselves in order to complete the user's transaction.

Given the preceding brief description of some current technology, the description of the remaining figures relates to federated computer environments in which the present invention may operate. Prior to discussing the present invention in more detail, however, some terminology is introduced.

Terminology

The terms "entity" or "party" generally refers to an organization, an individual, or a system that operates on behalf of an organization, an individual, or another system. The term "domain" connotes additional characteristics within a network environment, but the terms "entity", "party", and "domain" can be used interchangeably. For example, the term "domain" may also refer to a DNS (Domain Name System) domain, or more generally, to a data processing system that includes various devices and applications that appear as a logical unit to exterior entities.

The terms "request" and "response" should be understood to comprise data formatting that is appropriate for the transfer of information that is involved in a particular operation, such as messages, communication protocol information, or other associated information. A protected resource is a resource (an application, an object, a document, a page, a file, executable code, or other computational resource, communication-type resource, etc.) for which access is controlled or restricted.

A token provides direct evidence of a successful operation and is produced by the entity that performs the operation, e.g., an authentication token that is generated after a successful authentication operation. A Kerberos token is one example of an authentication token that may be used with the present invention. More information on Kerberos may be found in Kohl et al., "The Kerberos Network Authentication Service (V5)", Internet Engineering Task Force (IETF) Request for Comments (RFC) 1510, 09/1993.

An assertion provides indirect evidence of some action. Assertions may provide indirect evidence of identity, authentication, attributes, authorization decisions, or other information and/or operations. An authentication assertion provides indirect evidence of authentication by an entity that is not the authentication service but that listened to the authentication service.

A Security Assertion Markup Language (SAML) assertion is an example of a possible assertion format that may be used with the present invention. SAML has been promulgated by the Organization for the Advancement of Structured Information Standards (OASIS), which is a non-profit, global consortium. SAML is described in "Assertions and Protocol for the OASIS Security Assertion Markup Language (SAML)", Committee Specification 01, May 31, 2002, as follows:

> The Security Assertion Markup Language (SAML) is an XML-based framework for exchanging security information. This security information is expressed in the form of assertions about subjects, where a subject is an entity (either human or computer) that has an identity in some security domain. A typical example of a subject is a person, identified by his or her email address in a particular Internet DNS domain. Assertions can convey information about authentication acts performed by subjects, attributes of subjects, and authorization decisions about whether subjects are allowed to access certain resources. Assertions are represented as XML constructs and have a nested structure, whereby a single assertion might contain several different internal statements about authentication, authorization, and attributes. Note that assertions containing authentication statements merely describe acts of authentication that happened previously. Assertions are issued by SAML authorities, namely, authentication authorities, attribute authorities, and policy decision points. SAML defines a protocol by which clients can request assertions from SAML authorities and get a response from them. This protocol, consisting of XML-based request and response message formats, can be bound to many different underlying communications and transport protocols; SAML currently defines one binding, to SOAP over HTTP. SAML authorities can use various sources of information, such as external policy stores and assertions that were received as input in requests, in creating their responses. Thus, while clients always consume assertions, SAML authorities can be both producers and consumers of assertions.

The SAML specification states that an assertion is a package of information that supplies one or more statements made by an issuer. SAML allows issuers to make three different kinds of assertion statements: authentication, in which the specified subject was authenticated by a particular means at a particular time; authorization, in which a request to allow the specified subject to access the specified resource has been granted or denied; and attribute, in which the specified subject is associated with the supplied attributes. As discussed further below, various assertion formats can be translated to other assertion formats when necessary.

Authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, etc. An authentication credential is differentiated from an authentication assertion: an authentication credential is presented by a user as part of an authentication protocol sequence with an authentication server or service, and an authentication assertion is a statement about the successful presentation and validation of a user's authentication credentials, subsequently transferred between entities when necessary.

Federation Model for Computing Environment that May Incorporate the Present Invention In the context of the World Wide Web, users are coming to expect the ability to jump from interacting with an application on one Internet domain to another application on another domain with minimal regard to the information barriers between each particular domain. Users do not want the frustration that is caused by having to authenticate to multiple domains for a single transaction. In other words, users expect that organizations should interoperate, but users generally want domains to respect their privacy. In addition, users may prefer to limit the domains that permanently store private information. These user expectations exist in a rapidly evolving heterogeneous environment in which many enterprises and organizations are promulgating competing authentication techniques.

The present invention is supported within a federation model that allows enterprises to provide a single-sign-on experience to a user. In other words, the present invention may be implemented within a federated, heterogeneous environment. As an example of a transaction that would benefit from a federated, heterogeneous environment, referring again to FIG. 1E, user 190 is able to authenticate to domain 191 and then have domain 191 provide the appropriate assertions to each downstream domain that might be involved in a transaction. These downstream domains need to be able to understand and trust authentication assertions and/or other types of assertions, even though there are no pre-established assertion formats between domain 191 and these other downstream domains. In addition to recognizing the assertions, the downstream domains need to be able to translate the identity contained within an assertion to an identity that represents user 190 within a particular domain, even though there is no pre-established identity mapping relationship. It should be noted, though, that the present invention is applicable to various types of domains and is not limited to ISP-type domains that are represented within FIG. 1E as exemplary domains.

The present invention is supported within a federated environment. In general, an enterprise has its own user registry and maintains relationships with its own set of users. Each enterprise typically has its own means of authenticating these users. However, the federated scheme for use with the present invention allows enterprises to cooperate in a collective manner such that users in one enterprise can leverage relationships with a set of enterprises through an enterprise's participation in a federation of enterprises. Users can be granted access to resources at any of the federated enterprises as if they had a direct relationship with each enterprise. Users are not required to register at each business of interest, and users are not constantly required to identify and authenticate themselves. Hence, within this federated environment, an authentication scheme allows for a single-sign-on experience within the rapidly evolving heterogeneous environments in information technology.

In the context of the present invention, a federation is a set of distinct entities, such as enterprises, organizations, institutions, etc., that cooperate to provide a single-sign-on, ease-of-use experience to a user; a federated environment differs from a typical single-sign-on environment in that two enterprises need not have a direct, pre-established, relationship defining how and what information to transfer about a user. Within a federated environment, entities provide services which deal with authenticating users, accepting authentication assertions, e.g., authentication tokens, that are presented by other entities, and providing some form of translation of the identity of the vouched-for user into one that is understood within the local entity.

Federation eases the administrative burden on service providers. A service provider can rely on its trust relationships with respect to the federation as a whole; the service provider does not need to manage authentication information, such as user password information, because it can rely on authentication that is accomplished by a user's authentication home domain or an identity provider.

The system that supports the present invention also concerns a federated identity management system that establishes a foundation in which loosely coupled authentication, user enrollment, user profile management and/or authorization services collaborate across security domains. Federated identity management allows services residing in disparate security domains to securely interoperate and collaborate even though there may be differences in the underlying security mechanisms and operating system platforms at these disparate domains.

Identity Provider vs. Service Provider

As mentioned above and as explained in more detail further below, a federated environment provides significant user benefits. A federated environment allows a user to authenticate at a first entity, which may act as an issuing party to issue an authentication assertion about the user for use at a second entity. The user can then access protected resources at a second, distinct entity, termed the relying party, by presenting the authentication assertion that was issued by the first entity without having to explicitly re-authenticate at the second entity. Information that is passed from an issuing party to a relying party is in the form of an assertion, and this assertion may contain different types of information in the form of statements. For example, an assertion may be a statement about the authenticated identity of a user, or it may be a statement about user attribute information that is associated with a particular user.

Figure 2:
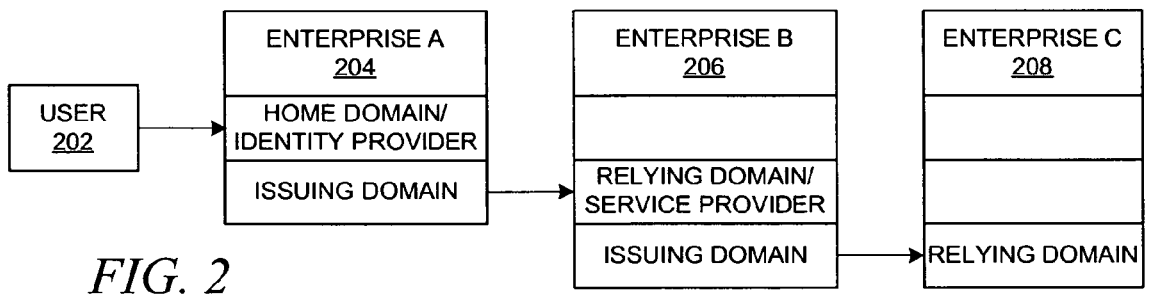
FIG. 2 depicts a block diagram that illustrates the terminology of the federated environment with respect to a transaction that is initiated by a user to a first federated enterprise, which, in response, invokes actions at downstream entities within the federated environment.

With reference now to FIG. 2, a block diagram depicts the terminology of the federated environment with respect to a transaction that is initiated by a user to a first federated enterprise, which, in response, invokes actions at downstream entities within the federated environment. FIG. 2 shows that the terminology may differ depending on the perspective of an entity within the federation for a given federated operation. More specifically, FIG. 2 illustrates that a computing environment that supports the present invention supports the transitivity of trust and the transitivity of the authentication assertion process; a domain or an entity can issue an assertion based on its trust in an identity as asserted by another domain or another entity.

User 202 initiates a transaction through a request for a protected resource at enterprise 204. If user 202 has been authenticated by enterprise 204 or will eventually be authenticated by enterprise 204 during the course of a transaction, then enterprise 204 may be termed the user's home domain for this federated session. Assuming that the transaction requires some type of operation by enterprise 206 and enterprise 204 transfers an assertion to enterprise 206, then enterprise 204 is the issuing entity with respect to the particular operation, and enterprise 206 is the relying entity for the operation.

The issuing entity issues an assertion for use by the relying domain; an issuing entity is usually, but not necessarily, the user's home domain or the user's identity provider. Hence, it would usually be the case that the issuing party has authenticated the user using a typical authentication operation. However, it is possible that the issuing party has previously acted as a relying party whereby it received an assertion from a different issuing party. In other words, since a user-initiated transaction may cascade through a series of enterprises within a federated environment, a receiving party may subsequently act as an issuing party for a downstream transaction. In general, any entity that has the ability to issue authentication assertions on behalf of a user can act as an issuing entity.

The relying entity is an entity that receives an assertion from an issuing entity. The relying party is able to accept, trust, and understand an assertion that is issued by a third party on behalf of the user, i.e. the issuing entity; it is generally the relying entity's duty to use an appropriate authentication authority to interpret an authentication assertion. A relying party is an entity that relies on an assertion that is presented on behalf of a user or another entity. In this manner, a user can be given a single-sign-on experience at the relying entity instead of requiring the relying entity to prompt the user for the user's authentication credentials as part of an interactive session with the user.

Referring again to FIG. 2, assuming that the transaction requires further operations such that enterprise 206 transfers an assertion to enterprise 208, then enterprise 206 is an upstream entity that acts as the issuing entity with respect to the subsequent or secondary transaction operation, and enterprise 208 is a downstream entity that acts as the relying entity for the operation; in this case, enterprise 208 may be regarded as another downstream entity with respect to the original transaction, although the subsequent transaction can also be described with respect to only two entities.

As shown in FIG. 2, a federated entity may act as a user's home domain, which provides identity information and attribute information about federated users. An entity within a federated computing environment that provides identity information, identity or authentication assertions, or identity services may be termed an identity provider. Other entities or federation partners within the same federation may rely on an identity provider for primary management of a user's authentication credentials, e.g., accepting a single-sign-on token that is provided by the user's identity provider; a domain at which the user authenticates may be termed the user's (authentication) home domain. The identity provider may be physically supported by the user's employer, the user's ISP, or some other commercial entity.

An identity provider is a specific type of service that provides identity information as a service to other entities within a federated computing environment. With respect to most federated transactions, an issuing party for an authentication assertion would usually be an identity provider; any other entity can be distinguished from the identity provider. Any other entity that provides a service within the federated computing environment can be categorized as a service provider. Once a user has authenticated to the identity provider, other entities or enterprises in the federation may be regarded as merely service providers for the duration of a given federated session or a given federated transaction.

In some circumstances, there may be multiple entities within a federated environment that may act as identity providers for a user. For example, the user may have accounts at multiple federated domains, each of which is able to act as an identity provider for the user; these domains do not necessarily have information about the other domains nor about a user's identity at a different domain.

Although it may be possible that there could be multiple enterprises within a federated environment that may act as identity providers, e.g., because there may be multiple enterprises that have the ability to generate and validate a user's authentication credentials, etc., a federated transaction usually involves only a single identity provider. If there is only a single federated entity that is able to authenticate a user, e.g., because there is one and only one entity within the federation with which the user has performed a federated enrollment or registration operation, then it would be expected that this entity would act as the user's identity provider in order to support the user's transactions throughout the federated environment.

Within some federated transactions that require the interoperation of multiple service providers, a downstream service provider may accept an assertion from an upstream service provider; the conditions in which an upstream service provider may act as an issuing entity to a downstream service provider that is acting as a relying party may depend upon the type of trust relationship between the service providers and the type of transaction between the service providers. Within the scope of a simple federated transaction, however, there is only one entity that acts as an issuing entity.

The present invention may be supported within a given computing environment in which a federated infrastructure can be added to existing systems while minimizing the impact on an existing, non-federated architecture. Hence, operations, including authentication operations, at any given enterprise or service provider are not necessarily altered by the fact that an entity may also participate within a federated environment. In other words, even though an entity's computing systems may be integrated into a federated environment, a user may be able to continue to perform various operations, including authentication operations, directly with an enterprise in a non-federated manner. However, the user may be able to have the same end-user experience while performing a federated operation with respect to a given entity as if the user had performed a similar operation with the given entity in a non-federated manner. Hence, it should be noted that not all of a given enterprise's users necessarily participate federated transactions when the given enterprise participates in a federation; some of the enterprise's users may interact with the enterprise's computing systems without performing any federated transactions.

Moreover, user registration within the computing environment of a given enterprise, e.g., establishment of a user account in a computer system, is not necessarily altered by the fact that the enterprise may also participate within a federated environment. For example, a user may still establish an account at a domain through a legacy or pre-existing registration process that is independent of a federated environment. Hence, in some cases, the establishment of a user account at an enterprise may or may not include the establishment of account information that is valid across a federation when the enterprise participates within a federated computing environment.

Federated Architecture—Federation Front-End for Legacy Systems

Figure 3:
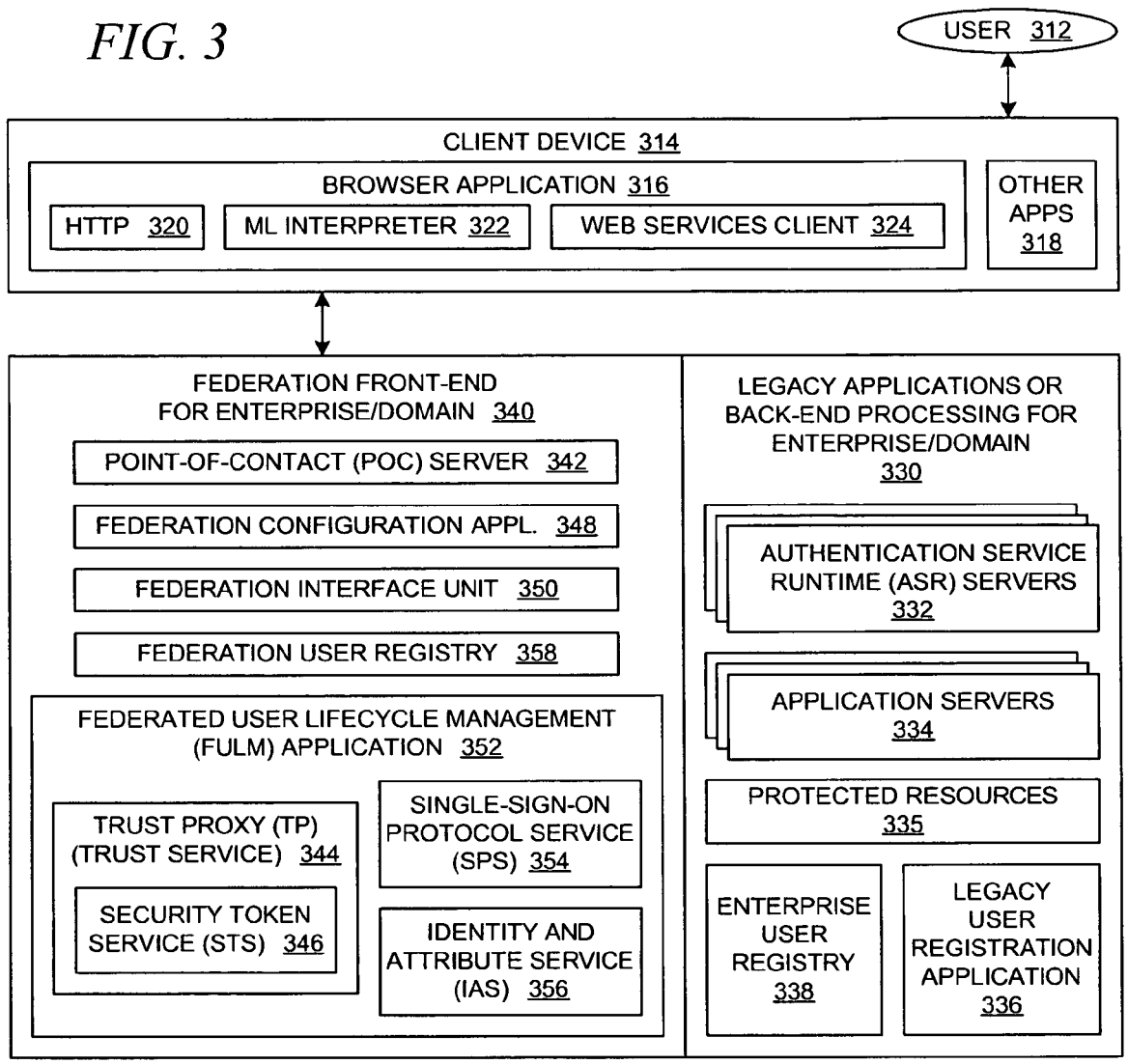
FIG. 3 depicts a block diagram that illustrates the integration of pre-existing data processing systems at a given domain with some federated architecture components that may be used to support an embodiment of the present invention.

With reference now to FIG. 3, a block diagram depicts the integration of pre-existing data processing systems at a given domain with some federated architecture components that may be used to support an embodiment of the present invention. A federated environment includes federated entities that provide a variety of services for users. User 312 interacts with client device 314, which may support browser application 216 and various other client applications 318. User 312 is distinct from client device 314, browser 316, or any other software that acts as interface between user and other devices and services. In some cases, the following description may make a distinction between the user acting explicitly within a client application and a client application that is acting on behalf of the user. In general, though, a requester is an intermediary, such as a client-based application, browser, SOAP client, etc., that may be assumed to act on behalf of the user.

Browser application 316 may be a typical browser, including those found on mobile devices, that comprises many modules, such as HTTP communication component 320 and markup language (ML) interpreter 322. Browser application 316 may also support plug-ins, such as web services client 324, and/or downloadable applets, which may or may not require a virtual machine runtime environment. Web services client 324 may use Simple Object Access Protocol (SOAP), which is a lightweight protocol for defining the exchange of structured and typed information in a decentralized, distributed environment. SOAP is an XML-based protocol that consists of three parts: an envelope that defines a framework for describing what is in a message and how to process it; a set of encoding rules for expressing instances of application-defined datatypes; and a convention for representing remote procedure calls and responses. User 312 may access web-based services using browser application 316, but user 312 may also access web services through other web service clients on client device 314. Some of the federated operations may employ HTTP redirection via the user's browser to exchange information between entities in a federated environment. However, it should be noted that the present invention may be supported over a variety of communication protocols and is not meant to be limited to HTTP-based communications. For example, the entities in the federated environment may communicate directly when necessary; messages are not required to be redirected through the user's browser.

The present invention may be supported in a manner such that components that are required for a federated environment can be integrated with pre-existing systems. FIG. 3 depicts one embodiment for implementing these components as a front-end to a pre-existing system. The pre-existing components at a federated domain can be considered as legacy applications or back-end processing components 330, which include authentication service runtime (ASR) servers 332 in a manner similar to that shown in FIG. 4. ASR servers 332 are responsible for authenticating users when the domain controls access to application servers 334, which can be considered to generate, retrieve, or otherwise support or process protected resources 335. The domain may continue to use legacy user registration application 336 to register users for access to application servers 334. Information that is needed to authenticate a registered user with respect to legacy operations is stored in enterprise user registry 338; enterprise user registry 338 may be accessible to federation components as well.

After joining a federated environment, the domain may continue to operate without the intervention of federated components. In other words, the domain may be configured so that users may continue to access particular application servers or other protected resources directly without going through a point-of-contact server or other component implementing this point-of-contact server functionality; a user that accesses a system in this manner would experience typical authentication flows and typical access. In doing so, however, a user that directly accesses the legacy system would not be able to establish a federated session that is known to the domain's point-of-contact server.

The domain's legacy functionality can be integrated into a federated environment through the use of federation front-end processing 340, which includes point-of-contact server 342 and trust proxy server 344 (or more simply, trust proxy 344 or trust service 344) which itself interacts with Security Token Service (STS) 346, which are described in more detail below with respect to FIG. 4. Federation configuration application 348 allows an administrative user to configure the federation front-end components to allow them to interface with the legacy back-end components through federation interface unit 350. Federated functionality may be implemented in distinct system components or modules. In a preferred embodiment, most of the functionality for performing federation operations may be implemented by a collection of logical components within a single federation application; federated user lifecycle management application 352 includes trust service 344 along with single-sign-on protocol service (SPS) 354. Trust service 344 may comprise identity-and-attribute service (I&AS) 356, which is responsible for identity mapping operations, attribute retrieval, etc., as part of federation functionality. Identity-and-attribute service 356 may also be employed by single-sign-on protocol service 354 during single-sign-on operations. A federation user registry 358 may be employed in certain circumstances to maintain user-related information for federation-specific purposes.

Legacy or pre-existing authentication services at a given enterprise may use various, well known, authentication methods or tokens, such as username/password or smart card token-based information. However, in a preferred federated computing system for supporting the present invention, the functionality of a legacy authentication service can be used in a federated environment through the use of point-of-contact servers. Users may continue to access a legacy authentication server directly without going through a point-of-contact server, although a user that accesses a system in this manner would experience typical authentication flows and typical access; a user that directly accesses a legacy authentication system would not be able to generate a federated authentication assertion as proof of identity in accordance with the present invention. One of the roles of the federation front-end is to translate a federated authentication token received at a point-of-contact server into a format understood by a legacy authentication service. Hence, a user accessing the federated environment via the point-of-contact server would not necessarily be required to re-authenticate to the legacy authentication service. Preferably, the user would be authenticated to a legacy authentication service by a combination of the point-of-contact server and a trust proxy such that it appears as if the user was engaged in an authentication dialog.

Figure 4:
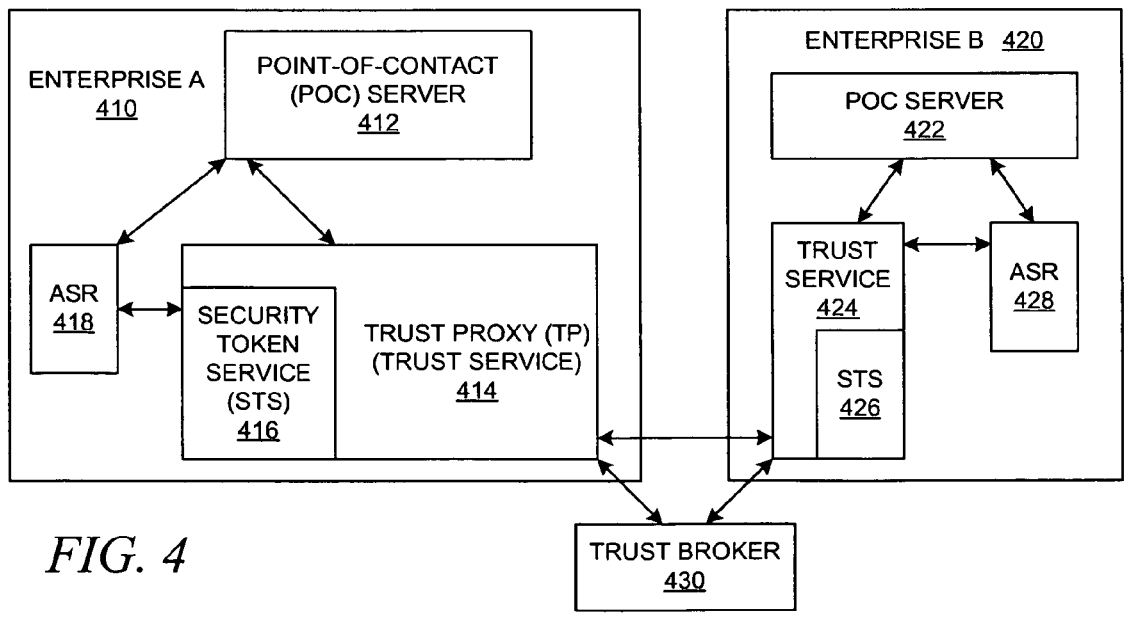
FIG. 4 depicts a block diagram that illustrates an example of a manner in which some components within a federated architecture may be used to establish trust relationships to support an implementation of the present invention.

Federated Architecture—Point-of-Contact Servers, Trust Proxies, and Trust Brokers With reference now to FIG. 4, a block diagram depicts an example of a manner in which some components within a federated architecture may be used to establish trust relationships to support an implementation of the present invention. A federated environment includes federated enterprises or similar entities that provide a variety of services for users. A user, through an application on a client device, may attempt to access resources at various entities, such as enterprise 410. A point-of-contact server at each federated enterprise, such as point-of-contact (POC) server 412 at enterprise 410, is the entry point into the federated environment for requests from a client to access resources that are supported and made available by enterprise 410. The point-of-contact server minimizes the impact on existing components within an existing, non-federated architecture, e.g., legacy systems, because the point-of-contact server handles many of the federation requirements. The point-of-contact server provides session management, protocol conversion, and possibly initiates authentication and/or attribute assertion conversion. For example, the point-of-contact server may translate HTTP or HTTPS messages to SOAP and vice versa. As explained in more detail further below, the point-of-contact server may also be used to invoke a trust proxy to translate assertions, e.g., a SAML token received from an issuing party can be translated into a Kerberos token understood by a receiving party.

A trust service (also termed a trust proxy, a trust proxy server, or a trust service), such as trust proxy (TP) 414 at enterprise 410, establishes and maintains a trust relationship between two entities in a federation. A trust service generally has the ability to handle authentication token format translation (through the security token service, which is described in more detail further below) from a format used by the issuing party to one understood by the receiving party.

Together, the use of a point-of-contact server and a trust service minimize the impact of implementing a federated architecture on an existing, non-federated set of systems. Hence, the exemplary federated architecture requires the implementation of at least one point-of-contact server and at least one trust service per federated entity, whether the entity is an enterprise, a domain, or other logical or physical entity. The exemplary federated architecture, though, does not necessarily require any changes to the existing, non-federated set of systems. Preferably, there is a single trust service for a given federated entity, although there may be multiple instances of a trust service component for availability purposes, or there may be multiple trust services for a variety of smaller entities within a federated entity, e.g., separate subsidiaries within an enterprise. It is possible that a given entity could belong to more than one federation, although this scenario would not necessarily require multiple trust services as a single trust service may be able to manage trust relationships within multiple federations.

One role of a trust service may be to determine or to be responsible for determining the required token type by another domain and/or the trust service in that domain. A trust service has the ability or the responsibility to handle authentication token format translation from a format used by the issuing party to one understood by the receiving party. Trust service 414 may also be responsible for any user identity translation or attribute translation that occurs for enterprise 410, or this responsibility may be supported by a distinct identity-and-attribute service, e.g., such as identity-and-attribute service 356 as shown in FIG. 3. In addition, a trust service can support the implementation of aliases as representatives of a user identity that uniquely identify a user without providing any addition information about the user's real world identity. Furthermore, a trust proxy can issue authorization and/or session credentials for use by the point-of-contact server. However, a trust service may invoke a trust broker for assistance, as described further below. Identity translation may be required to map a user's identity and attributes as known to an issuing party to one that is meaningful to a receiving party. This translation may be invoked by either a trust service at an issuing entity, a trust service at a receiving entity, or both.

Trust service 414, or a distinct identity-and-attribute service as mentioned above, may include (or interact with) an internalized component, shown as security token service (STS) component 416, which will provide token translation and will invoke authentication service runtime (ASR) 418 to validate and generate tokens. The security token service provides the token issuance and validation services required by the trust service, which may include identity translation. The security token service therefore includes an interface to existing authentication service runtimes, or it incorporates authentication service runtimes into the service itself. Rather than being internalized within the trust service, the security token service component may also be implemented as a stand-alone component, e.g., to be invoked by the trust service, or it may be internalized within a transaction server, e.g., as part of an application server.

For example, an security token service component may receive a request to issue a Kerberos token. As part of the authentication information of the user for whom the token is to be created, the request may contain a binary token containing a username and password. The security token service component will validate the username and password against, e.g., an LDAP runtime (typical authentication) and will invoke a Kerberos KDC (Key Distribution Center) to generate a Kerberos ticket for this user. This token is returned to the trust service for use within the enterprise; however, this use may include externalizing the token for transfer to another domain in the federation.

In a manner similar to that described with respect to FIG. 1D, a user may desire to access resources at multiple enterprises within a federated environment, such as both enterprise 410 and enterprise 420. In a manner similar to that described above for enterprise 410, enterprise 420 comprises point-of-contact server 422, trust service 424, security token service (STS) 426, and authentication service runtime 428. Although the user may directly initiate separate transactions with each enterprise, the user may initiate a transaction with enterprise 410 which cascades throughout the federated environment. Enterprise 410 may require collaboration with multiple other enterprises within the federated environment, such as enterprise 420, to complete a particular transaction, even though the user may not have been aware of this necessity when the user initiated a transaction. Enterprise 420 becomes involved as a downstream entity, and enterprise 410 may present a assertion to enterprise 420 if necessary in order to further the user's federated transaction.

It may be the case that a trust service does not know how to interpret the authentication token that is received by an associated point-of-contact server and/or how to translate a given user identity and attributes. In this case, the trust service may choose to invoke functionality at a trust broker component, such as trust broker 430. A trust broker maintains relationships with individual trust proxies/services, thereby providing transitive trust between trust services. Using a trust broker allows each entity within a federated environment, such enterprises 410 and 420, to establish a trust relationship with the trust broker rather than establishing multiple individual trust relationships with each entity in the federated environment. For example, when enterprise 420 becomes involved as a downstream entity for a transaction initiated by a user at enterprise 410, trust service 414 at enterprise 410 can be assured that trust service 424 at enterprise 420 can understand an assertion from trust service 414 by invoking assistance at trust broker 430 if necessary. Although FIG. 4 depicts the federated environment with a single trust broker, a federated environment may have multiple trust brokers.

It should be noted that although FIG. 4 depicts point-of-contact server 412, trust service 414, security token service component 416, and authentication service runtime 418 as distinct entities, it is not necessary for these components to be implemented on separate components. For example, it is possible for the functionality of these separate components to be implemented as a single application, as applications on a single physical device, or as distributed applications on multiple physical devices. In addition, FIG. 4 depicts a single point-of-contact server, a single trust service, and a single security token server for an enterprise, but an alternative configuration may include multiple point-of-contact servers, multiple trust services, and multiple security token servers for each enterprise. The point-of-contact server, the trust service, the security token service, and other federated entities may be implemented in various forms, such as software applications, objects, modules, software libraries, etc.

A trust service/STS may be capable of accepting and validating many different authentication credentials, including traditional credentials such as a username and password combinations and Kerberos tickets, and federated authentication token formats, including authentication tokens produced by a third party. A trust service/STS may allow the acceptance of an authentication token as proof of authentication elsewhere. The authentication token is produced by an issuing party and is used to indicate that a user has already authenticated to that issuing party. The issuing party produces the authentication token as a means of asserting the authenticated identity of a user. A trust service/STS is also able to process attribute tokens or tokens that are used to secure communication sessions or conversations, e.g., those that are used to manage session information in a manner similar to an SSL session identifier.

A security token service invokes an authentication service runtime as necessary. The authentication service runtime supports an authentication service capable of authenticating a user. The authentication service acts as an authentication authority that provides indications of successful or failed authentication attempts via authentication responses. The trust service/STS may internalize an authentication service, e.g., a scenario in which there is a brand-new installation of a web service that does not need to interact with an existing legacy infrastructure. Otherwise, the security token service component will invoke external authentication services for validation of authentication tokens. For example, the security token service component could "unpack" a binary token containing a username/password and then use an LDAP service to access a user registry to validate the presented credentials.

When used by another component such as an application server, the security token service component can be used to produce tokens required for single-sign-on to legacy authentication systems; this functionality may be combined with or replaced by functionality within a single-sign-on protocol service, such as SPS 354 that is shown in FIG. 3. Hence, the security token service component can be used for token translation for internal purposes, i.e. within an enterprise, and for external purposes, i.e. across enterprises in a federation. As an example of an internal purpose, a Web application server may interface to a mainframe via an IBM CICS (Customer Information Control System) transaction gateway; CICS is a family of application servers and connectors that provides enterprise-level online transaction management and connectivity for mission-critical applications. The Web application server may invoke the security token service component to translate a Kerberos ticket (as used internally by the Web application server) to an IBM RACF® passticket required by the CICS transaction gateway.

The entities that are shown in FIG. 4 can be explained using the terminology that was introduced above, e.g., "identity provider" and "service provider". As part of establishing and maintaining trust relationships, an identity provider's trust service can determine what token types are required/accepted by a service provider's trust service. Thus, trust services use this information when invoking token services from a security token service. When an identity provider's trust service is required to produce an authentication assertion for a service provider, the trust service determines the required token type and requests the appropriate token from the security token service.

When a service provider's trust service receives an authentication assertion from an identity provider, the trust service knows what type of assertion that it expected and what type of assertion that it needs for internal use within the service provider. The service provider's trust service therefore requests that the security token service generate the required internal-use token based on the token in the received authentication assertion.

Both trust services and trust brokers have the ability to translate an assertion received from an identity provider into a format that is understood by a service provider. The trust broker has the ability to interpret the assertion format (or formats) for each of the trust services with whom there is a direct trust relationship, thereby allowing the trust broker to provide assertion translation between an identity provider and a service provider. This translation can be requested by either party through its local trust service. Thus, the identity provider's trust service can request translation of an assertion before it is sent to the service provider. Likewise, the service provider's trust service can request translation of an assertion received from an identity provider.

Assertion translation comprises user identity translation, authentication assertion translation, attribute assertion translation, or other forms of assertion translation. Reiterating the point above, assertion translation is handled by the trust components within a federation, e.g., trust services and trust brokers. A trust service may perform the translation locally, either at the identity provider or at the service provider, or a trust service may invoke assistance from a trust broker.

Assuming that an identity provider and a service provider already have individual trust relationships with a trust broker, the trust broker can dynamically create, i.e. broker, new trust relationships between issuing parties and relying parties if necessary. After the initial trust relationship brokering operation that is provided by the trust broker, the identity provider and the service provider may directly maintain the relationship so that the trust broker need not be invoked for future translation requirements. It should be noted that translation of authentication tokens can happen at three possible places: the identity provider's trust service, the service provider's trust service, and the trust broker. Preferably, the identity provider's trust service generates an authentication assertion that is understood by the trust broker to send to the service provider. The service provider then requests a translation of this token from the trust broker into a format recognizable by the service provider. Token translation may occur before transmission, after transmission, or both before and after transmission of the authentication assertion.

Trust Relationships within Federated Architecture

Within an exemplary federated environment that is able to support the present invention, there are two types of "trust domains" that must be managed: enterprise trust domains and federation trust domains. The differences between these two types of trust domain are based in part on the business agreements governing the trust relationships with the trust domain and the technology used to establish trust. An enterprise trust domain contains those components that are managed by the enterprise; all components within that trust domain may implicitly trust each other. In general, there are no business agreements required to establish trust within an enterprise because the deployed technology creates inherent trust within an enterprise, e.g., by requiring mutually authenticated SSL sessions between components or by placing components within a single, tightly controlled data center such that physical control and proximity demonstrate implicit trust. Referring to FIG. 2B, the legacy applications and back-end processing systems may represent an enterprise trust domain, wherein the components communicate on a secure internal network.

Federation trust domains are those that cross enterprise boundaries; from one perspective, a federation trust domain may represent trust relationships between distinct enterprise trust domains. Federation trust domains are established through trust proxies across enterprise boundaries between federation partners. Trust relationships involve some sort of a bootstrapping process by which initial trust is established between trust proxies. Part of this bootstrap process may include the establishment of shared secret keys and rules that define the expected and/or allowed token types and identifier translations. In general, this bootstrapping process can be implemented out-of-band as this process may also include the establishment of business agreements that govern an enterprise's participation in a federation and the liabilities associated with this participation.

There are a number of possible mechanisms for establishing trust in a federated business model. In a federation model, a fundamental notion of trust between the federation participants is required for business reasons in order to provide a level of assurance that the assertions (including tokens and attribute information) that are transferred between the participants are valid. If there is no trust relationship, then the service provider cannot depend upon the assertions received from the identity provider; they cannot be used by the service provider to determine how to interpret any information received from the identity provider.

For example, a large corporation may want to link several thousand global customers, and the corporation could use non-federated solutions. As a first example, the corporation could require global customers to use a digital certificate from a commercial certificate authority to establish mutual trust. The commercial certificate authority enables the servers at the corporation to trust servers located at each of the global customers. As a second example, the corporation could implement third-party trust using Kerberos; the corporation and its global customers could implement a trusted third-party Kerberos domain service that implements shared-secret-based trust. As a third example, the corporation could establish a private scheme with a proprietary security message token that is mutually trusted by the servers of its global customers.

Any one of these approaches may be acceptable if the corporation needed to manage trust relationships with a small number of global customers, but this may become unmanageable if there are hundreds or thousands of potential federation partners. For example, while it may be possible for the corporation to force its smaller partners to implement a private scheme, it is unlikely that the corporation will be able to impose many requirements on its larger partners.

An enterprise may employ trust relationships established and maintained through trust proxies and possibly trust brokers. An advantage of the exemplary federated architecture that is shown in the figures is that it does not impose additional requirements above and beyond the current infrastructures of an enterprise and its potential federation partners.

However, this exemplary federation architecture does not relieve an enterprise and its potential federation partners from the preliminary work required to establish business and liability agreements that are required for participation in the federation. In addition, the participants cannot ignore the technological bootstrapping of a trust relationship. The exemplary federation architecture allows this bootstrapping to be flexible, e.g., a first federation partner can issue a Kerberos ticket with certain information, while a second federation partner can issue a SAML authentication assertion with certain information.

In the exemplary federation architecture, the trust relationships are managed by the trust proxies, which may include (or may interact with) a security token service that validates and translates a token that is received from an identity provider based on the pre-established relationship between two trust proxies. In situations where it is not feasible for a federated enterprise to establish trust relationships (and token translation) with another federated enterprise, a trust broker may be invoked; however, the federated enterprise would need to establish a relationship with a trust broker.

Figure 5:
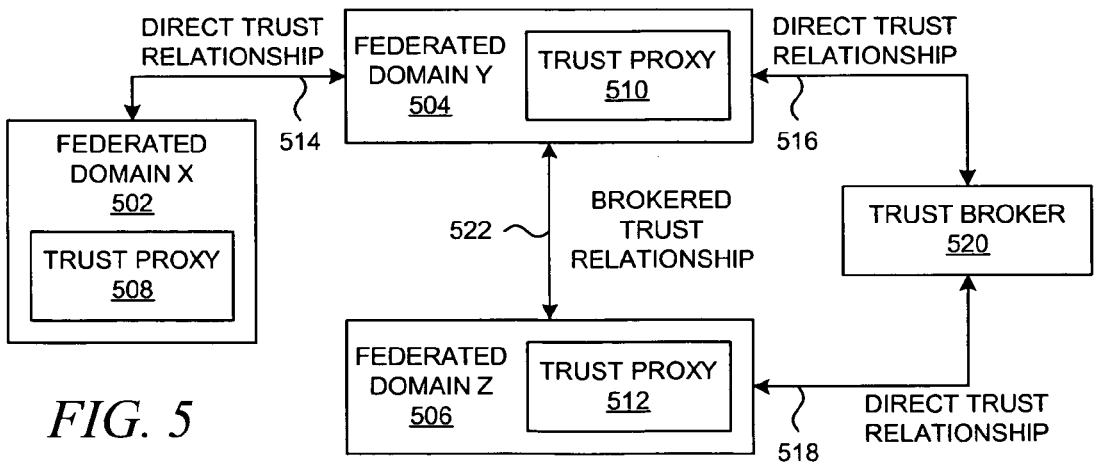
FIG. 5 depicts a block diagram that illustrates an exemplary set of trust relationships between federated domains using trust proxies and a trust broker in accordance with an exemplary federated architecture that is able to support the present invention.

With reference now to FIG. 5, a block diagram depicts an exemplary set of trust relationships between federated domains using trust proxies and a trust broker in accordance with an exemplary federated architecture that is able to support the present invention. Although FIG. 4 introduced the trust broker, FIG. 5 illustrates the importance of transitive trust relationships within the exemplary federated architecture.

Federated domains 502-506 incorporate trust proxies 508-512, respectively. Trust proxy 508 has direct trust relationship 514 with trust proxy 510. Trust broker 520 has direct trust relationship 516 with trust proxy 510, and trust broker 520 has direct trust relationship 518 with trust proxy 512. Trust broker 520 is used to establish, on behalf of a federation participant, a trust relationship based on transitive trust with other federation partners. The principle of transitive trust allows trust proxy 510 and trust proxy 512 to have brokered trust relationship 522 via trust broker 520. Neither trust proxy 510 nor 512 need to know how to translate or validate the other's assertions; the trust broker may be invoked to translate an assertion into one that is valid, trusted, and understood at the other trust proxy.

Business agreements that specify contractual obligations and liabilities with respect to the trust relationships between federated enterprises can be expressed in XML through the use of the ebXML (Electronic Business using XML) standards. For example, a direct trust relationship could be represented in an ebXML document; each federated domain that shares a direct trust relationship would have a copy of a contract that is expressed as an ebXML document. Operational characteristics for various entities within a federation may be specified within ebXML choreographies and published within ebXML registries; any enterprise that wishes to participate in a particular federation, e.g., to operate a trust proxy or trust broker, would need to conform to the published requirements that were specified by that particular federation for all trust proxies or trust brokers within the federation. A security token service could parse these ebXML documents for operational details on the manner in which tokens from other domains are to be translated. It should be noted, though, that other standards and mechanisms could be employed to support the present invention for specifying the details about the manner in which the trust relationships within a federation are implemented.

Single-Sign-on within Federated Architecture

During a given user's session, the user may visit many federated domains to use the web services that are offered by those domains. Domains can publish descriptions of services that they provide using standard specifications such as UDDI and WSDL, both of which use XML as a common data format. The user finds the available services and service providers through applications that also adhere to these standard specifications. SOAP provides a paradigm for communicating requests and responses that are expressed in XML. Entities within a federated environment may employ these standards among others.

Within a federation, a user expects to have a single-sign-on experience in which the user completes a single authentication operation, and this authentication operation suffices for the duration of the user's session, regardless of the federation partners visited during that session. A session can be defined as the set of transactions from (and including) the initial user authentication, i.e. logon, to logout. Within a session, a user's actions will be governed in part by the privileges granted to the user for that session.

The federated architecture that is described hereinabove supports single-sign-on operations. To facilitate a single-sign-on experience, web services that support the federated environment will also support using an authentication assertion or security token generated by a third-party to provide proof of authentication of a user. This assertion will contain some sort of evidence of the user's successful authentication to the issuing party together with an identifier for that user. For example, a user may complete traditional authentication operation with one federation partner, e.g., by providing a username and password that the federation partners uses to build authentication credentials for the user, and then the federation partner is able to provide a SAML authentication assertion that is generated by the authenticating/issuing party to a different federation partner.

The federated environment also allows web services or other applications to request web services, and these web services would also be authenticated. Authentication in a web services environment is the act of verifying the claimed identity of the web services request so that the enterprise can restrict access to authorized clients. A user who requests or invokes a web service would almost always authenticated, so the need for authentication within a federated environment that supports the present invention is not any different from current requirements of web services for user authentication.

Authentication of users that are accessing the computational resources of an enterprise without participating in a federated session are not impacted by the presence of a federated infrastructure. For example, an existing user who authenticates with a forms-based authentication mechanism over HTTP/S to access non-federated resources at a particular domain is not affected by the introduction of support at the domain for the federated environment. Authentication is handled in part by a point-of-contact server, which in turn may invoke a separate trust proxy or trust service component; the use of a point-of-contact server minimizes the impact on the infrastructure of an existing domain. For example, the point-of-contact server can be configured to pass through all non-federated requests to be handled by the back-end or legacy applications and systems at the domain.

The point-of-contact server may choose to invoke an HTTP-based authentication method, such as basic authentication, forms-based authentication, or some other authentication method. The point-of-contact server also supports a federation domain by recognizing an assertion that has been presented by the user as proof of authentication, such as an SAML authentication assertion, wherein the assertion has crossed between enterprise domains. The point-of-contact server may invoke the trust service, which in turn may invoke its security token service for validation of authentication credentials/security tokens.

Authentication of web services or other applications comprises the same process as authentication of users. Requests from web services carry a security token containing an authentication assertion, and this security token would be validated by the trust service in the same manner as a token presented by a user. A request from a web service should be accompanied by this token because the web service would have discovered what authentication assertions/security tokens were required by the requested service as advertised in UDDI.

Figure 6:
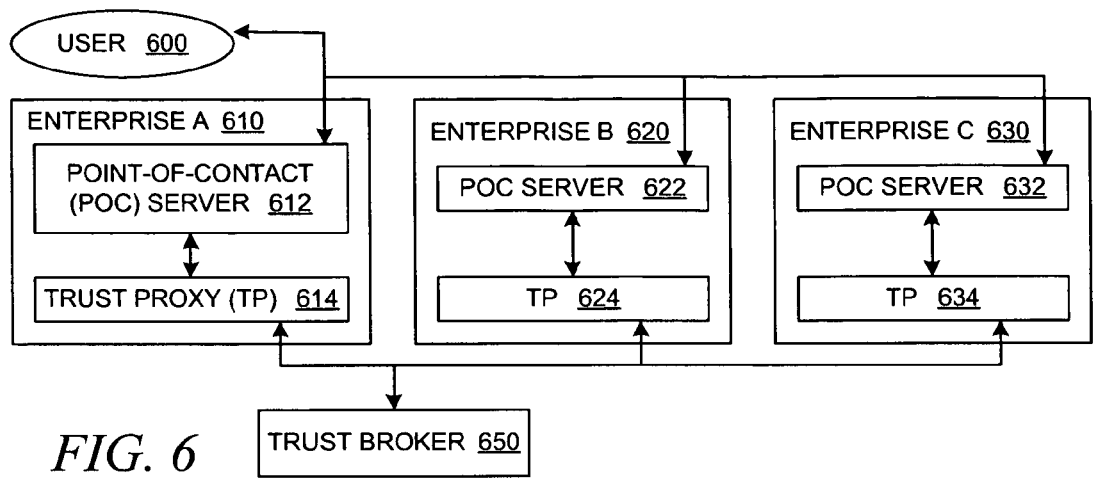
FIG. 6 depicts a block diagram that illustrates a federated environment that supports federated single-sign-on operations.

With reference now to FIG. 6, a block diagram depicts a federated environment that supports federated single-sign-on operations. User 600, through a client device and an appropriate client application, such as a browser, desires to access a web service that is provided by enterprise/domain 610, which supports data processing systems that act as a federated domain within a federated environment. Domain 610 supports point-of-contact server 612 and trust proxy or trust service 614; similarly, domain 620 supports point-of-contact server 622 and trust proxy or trust service 624, while domain 630 supports point-of-contact server 632 and trust proxy or trust service 634. The trust proxies/services rely upon trust broker 650 for assistance, as described above. Additional domains and trust proxies/services may participate in the federated environment. FIG. 6 is used to describe a federated single-sign-on operation between domain 610 and domain 620; a similar operation may occur between domain 610 and domain 630.

The user completes an authentication operation with respect to domain 610; this authentication operation is handled by point-of-contact server 612. The authentication operation is triggered when the user requests access to some resource that requires an authenticated identity, e.g., for access control purposes or for personalization purposes. Point-of-contact server 612 may invoke a legacy authentication service, or it may invoke trust proxy 614 to validate the user's presented authentication credentials. Domain 610 becomes the user's identity provider or home domain for the duration of the user's federated session.

At some later point in time, the user initiates a transaction at a federation partner, such as enterprise 620 that also supports a federated domain, thereby triggering a federated single-sign-on operation. For example, a user may initiate a new transaction at domain 620, or the user's original transaction may cascade into one or more additional transactions at other domains. As another example, the user may invoke a federated single-sign-on operation to a resource in domain 620 via point-of-contact server 612, e.g., by selecting a special link on a web page that is hosted within domain 610 or by requesting a portal page that is hosted within domain 610 but that displays resources hosted in domain 620. Point-of-contact server 612 sends a request to trust proxy 614 to generated a federation single-sign-on token for the user that is formatted to be understood or trusted by domain 620. Trust proxy 614 returns this token to point-of-contact server 612, which sends this token to point-of-contact server 622 in domain. Domain 610 acts as an issuing party for the user at domain 620, which acts as a relying party. The user's token would be transferred with the user's request to domain 620; this token may be sent using HTTP redirection via the user's browser, or it may be sent by invoking the request directly of point-of-contact server 622 (over HTTP or SOAP-over-HTTP) on behalf of the user identified in the token supplied by trust proxy 614.

Point-of-contact server 622 receives the request together with the federation single-sign-on token and invokes trust proxy 624. Trust proxy 624 receives the federation single-sign-on token, validates the token, and assuming that the token is valid and trusted, generates a locally valid token for the user. Trust proxy 624 returns the locally valid token to point-of-contact server 622, which establishes a session for the user within domain 620. If necessary, point-of-contact server 622 can initiate a federated single-sign-on at another federated partner.

Validation of the token at domain 620 is handled by the trust proxy 624, possibly with assistance from a security token service. Depending on the type of token presented by domain 610, the security token service may need to access a user registry at domain 620. For example, domain 620 may provide a binary security token containing the user's name and password to be validated against the user registry at domain 620. Hence, in this example, an enterprise simply validates the security token from a federated partner. The trust relationship between domains 610 and 620 ensures that domain 620 can understand and trust the security token presented by domain 610 on behalf of the user.

Federated single-sign-on requires not only the validation of the security token that is presented to a relying domain on behalf of the user but the determination of a locally valid user identifier at the relying domain based on information contained in the security token. One result of a direct trust relationship and the business agreements required to establish such a relationship is that at least one party, either the issuing domain or the relying domain or both, will know how to translate the information provided by the issuing domain into an identifier valid at the relying domain. In the brief example above, it was assumed that the issuing domain, i.e. domain 610, is able to provide the relying domain, i.e. domain 620, with a user identifier that is valid in domain 620. In that scenario, the relying domain did not need to invoke any identity mapping functionality. Trust proxy 624 at domain 620 will generate a security token for the user that will "vouch-for" this user. The types of tokens that are accepted, the signatures that are required on tokens, and other requirements are all pre-established as part of the federation's business agreements. The rules and algorithms that govern identifier translation are also pre-established as part of the federation's business agreements. In the case of a direct trust relationship between two participants, the identifier translation algorithms will have been established for those two parties and may not be relevant for any other parties in the federation.

However, it is not always the case that the issuing domain will know how to map the user from a local identifier for domain 610 to a local identifier for domain 620. In some cases, it may be the relying domain that knows how to do this mapping, while in yet other cases, neither party will know how to do this translation, in which case a third party trust broker may need to be invoked. In other words, in the case of a brokered trust relationship, the issuing and relying domains do not have a direct trust relationship with each other. They will, however, have a direct trust relationship with a trust broker, such as trust broker 650. Identifier mapping rules and algorithms will have been established as part of this relationship, and the trust broker will use this information to assist in the identifier translation that is required for a brokered trust relationship.

Domain 620 receives the token that is issued by domain 610 at point-of-contract server 622, which invokes trust proxy 624 to validate the token and perform identity mapping. In this case, since trust proxy 624 is not able to map the user from a local identifier for domain 610 to a local identifier for domain 620, trust proxy 624 invokes trust broker 650, which validates the token and performs the identifier mapping. After obtaining the local identifier for the user, trust proxy 624, possibly through its security token service, can generate any local tokens that are required by the back-end applications at domain 620, e.g., a Kerberos token may be required to facilitate single-sign-on from the point-of-contact server to the application server. After obtaining a locally valid token, if required, the point-of-contact server is able to build a local session for the user. The point-of-contract server will also handle coarse-grained authorization of user requests and forward the authorized requests to the appropriate application servers within domain 620.

Federated User Lifecycle Management

A portion of the above description of FIGS. 2-6 explained an organization of components that may be used in a federated environment while other portions explained the processes for supporting single-sign-on operations across the federated environment. Service providers or relying domains within a federated environment do not necessarily have to manage a user's authentication credentials, and those relying domains can leverage a single single-sign-on token that is provided by the user's identity provider or home domain. The description of FIGS. 2-6 above, though, does not explain an explicit process by which federated user lifecycle management may be accomplished in an advantageous manner at the federated domains of federation partners.

Federated user lifecycle management functionality/service comprises functions for supporting or managing federated operations with respect to the particular user accounts or user profiles of a given user at multiple federated domains; in some cases, the functions or operations are limited to a given federated session for the user. In other words, federated user lifecycle management functionality refers to the functions that allow management of federated operations across a plurality of federated partners, possibly only during the lifecycle of a single user session within a federated computing environment.

Each federated domain might manage a user account, a user profile, or a user session of some kind with respect to the functions at each respective federated domain. For example, a particular federated domain might not manage a local user account or user profile within the particular federated domain, but the federated domain might manage a local user session for a federated transaction after the successful completion of a single-sign-on operation at the federated domain. As part of the federated user lifecycle management functionality that is supported by that particular federated domain, the federated domain can participate in a single-sign-off operation that allows the federated domain to terminate the local user session after the federated transaction is complete, thereby improving security and promoting efficient use of resources.

In another example of the use of federated user lifecycle management functionality, a user may engage in an online transaction that requires the participation of multiple federated domains. A federated domain might locally manage a user profile in order to tailor the user's experience with respect to the federated domain during each of the user's federated sessions that involve the federated domain. As part of the federated user lifecycle management functionality that is supported by that particular federated domain, the information in the federated domain's local user profile can be used in a seamless manner during a given federated transaction with information from other profiles at other federated domains that are participating in the given federated transaction. For example, the information from the user's multiple local user profiles might be combined in some type of merging operation such that the user's information is visually presented to the user, e.g., within a web page, in a manner such that the user is not aware of the different origins or sources of the user's information.

Federated user lifecycle management functionality may also comprise functions for account linking/delinking. A user is provided with a common unique user identifier across federation partners, which enables single-sign-on and the retrieval of attributes (if necessary) about a user as part of the fulfillment of a request at one federation partner. Furthermore, the federation partner can request additional attributes from an identity provider using the common unique user identifier to refer to the user in an anonymous manner.

Figure 7:
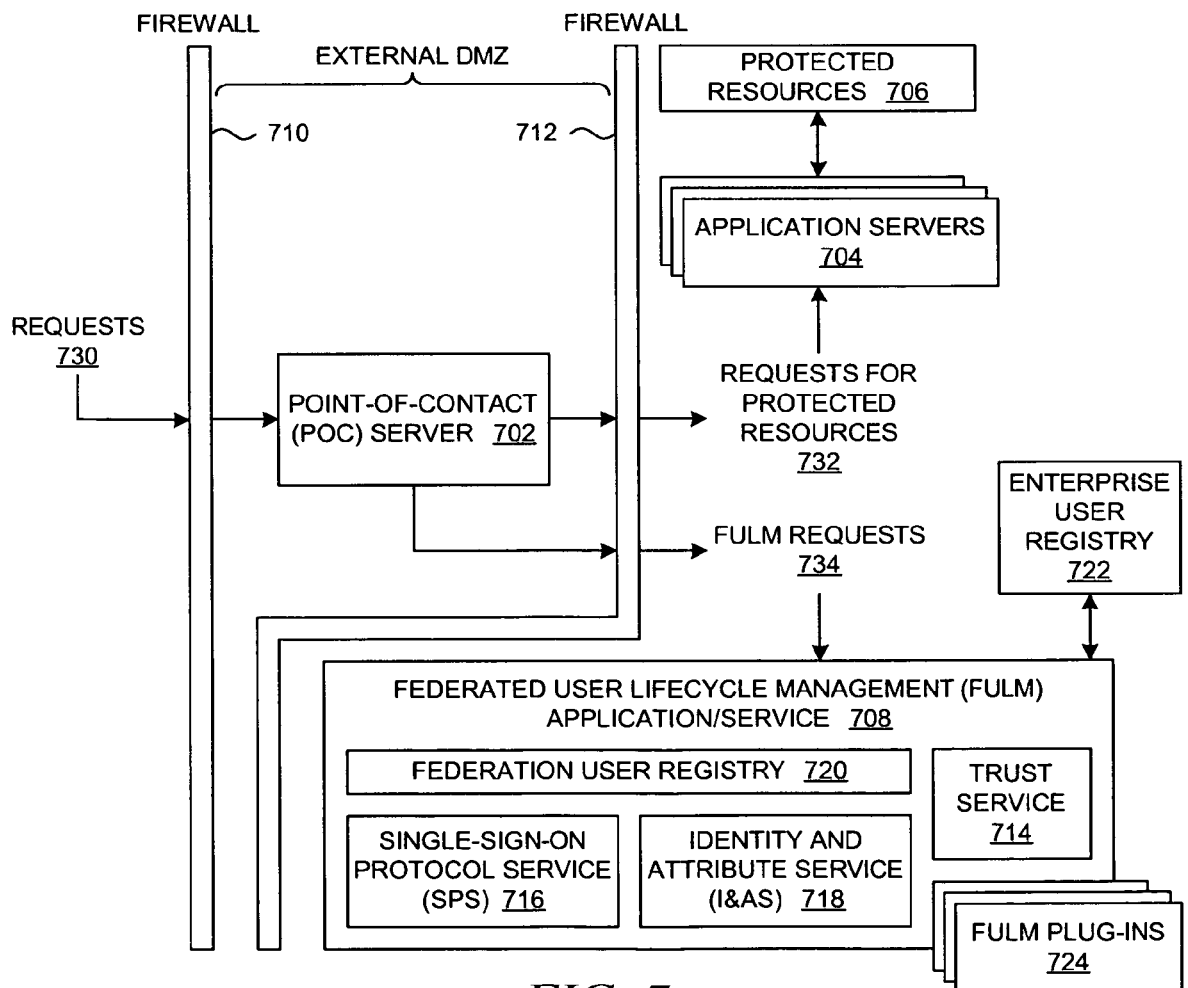
FIG. 7 depicts a block diagram that illustrates some of the components in a federated domain for implementing federated user lifecycle management functionality in order to support the present invention.

With reference now to FIG. 7, a block diagram depicts some of the components in a federated domain for implementing federated user lifecycle management functionality in order to support the present invention. FIG. 7 depicts elements at a single federated domain, such as the federated domain that is shown in FIG. 3. Some of the elements in FIG. 7 are similar or identical to elements that have been discussed hereinabove with respect to other figures, such as FIG. 3: point-of-contact server/service 702 is equivalent to point-of-contact server 342; application servers 704, which run services that control access to protected resources, are equivalent to application servers 334; protected or controlled resources 706 are equivalent to protected resources 335; and federated user lifecycle management (FULM) application 708 is equivalent to federated user lifecycle management application 352. Although firewalls were not illustrated within FIG. 3, firewalls are illustrated within FIG. 7. Firewall 710 and firewall 712 create an external DMZ (electronic DeMilitarized Zone) that protects the enterprise's computing environment from computing threats outside of the enterprise's domain, e.g., via the Internet.

The different perspectives that are shown in FIG. 3 and FIG. 7 are not incompatible or at cross-purposes. In contrast with the example that is shown in FIG. 7, FIG. 3 does not illustrate the firewalls, yet point-of-contact server 342 resides within federation front-end 340; in addition, federated user lifecycle management application 352 is contained within federation front-end 340. In FIG. 7, point-of-contact server 702 is illustrated as residing within the DMZ between firewalls 710 and 712, which form an electronic or physical front-end to the enterprise domain; in addition, federated user lifecycle management application/service 708 resides electronically behind firewall 712. Trust service 714, single-sign-on protocol service 716, and identity-and-attribute service 718 employ enterprise user registry 720 and federation user registry 722 as necessary. The different perspectives of FIG. 3 and FIG. 7 can be reconciled by regarding federation front-end 340 and back-end 330 in FIG. 3 as a logical organization of components while regarding the DMZ and the other components in FIG. 7 as forming a physical or electronic front-end and a physical or electronic back-end, either of which may contain federated components.

Reiterating the roles of a point-of-contact entity/service, the point-of-contact entity provides session management, at least with respect to a user's interaction with the federation functionality with an enterprise's computing environment; applications within a legacy back-end of the enterprise's computing environment may also implement its own session management functionality. Assuming that an enterprise implements policy functionality with respect to the federated computing environment, the point-of-contact entity may act as a policy enforcement point to some other federation partner's policy decision point. In addition, assuming that it is permissible given the implementation of the federation functionality, the point-of-contact entity is responsible for initiating a direction authentication operation against a user in those scenarios in which a single-sign-on operation is not employed. As such, the point-of-contact entity may be implemented in a variety of forms, e.g., as a reverse proxy server, as a web server plug-in, or in some other manner. The point-of-contact functionality may also be implemented within an application server itself, in which case the federated user lifecycle management services may be logically located within the DMZ.

More importantly, referring again to FIG. 7, federated user lifecycle management application 708 also comprises support for interfacing to, interacting with, or otherwise interoperating with federated user lifecycle management plug-ins 724, which are not shown in FIG. 3. In the exemplary architecture that is shown in FIG. 7, federated protocol runtime plug-ins provide the functionality for various types of independently published or developed federated user lifecycle management standards or profiles, such as: WS-Federation Passive Client; and Liberty Alliance ID-FF Single Sign On (B/A, B/P and LECP), Register Name Identifier, Federation Termination Notification, and Single Logout. Different sets of federated protocols may be accessed at different URI's. This approach allows the federated user lifecycle management application to concurrently support multiple standards or specifications of federated user lifecycle management, e.g., the WS-Federation web services specification versus the Liberty Alliance's specifications, within a single application, thereby minimizing the configuration impact on the overall environment for supporting different federation protocols.

More specifically, the appropriate federated user lifecycle management functionality is invoked by the point-of-contact server by redirecting and/or forwarding user requests to the federated user lifecycle management application as appropriate. Referring again to FIG. 7, point-of-contact server 702 receives user requests 730, which are then analyzed to determine the type of request that has been received, which might be indicated by the type of request message that has been received or, as noted above, by determining the destination URI within the request message. While requests 732 for protected resources continue to be forwarded to application servers 704, requests 734 for federated user lifecycle management functions, e.g., requests to invoke a single-sign-off operation, are forwarded to federated user lifecycle management application 708, which invokes the appropriate federated user lifecycle management plug-in as necessary to fulfill the received request. When a new federation protocol or a new federated function is defined, or when an existing one is somehow modified or refined, support can be added simply by plugging a new support module or can be refined by modifying a previously installed plug-in.

The exemplary implementation of a federated user lifecycle management application in FIG. 7 illustrates that the federated user lifecycle management application is able to support multiple, simultaneous, federated user lifecycle management functions while providing a pluggability feature, thereby allowing new functionality to be added to the federated user lifecycle management application in the form of a plug-in when needed without requiring any changes to the existing infrastructure. For example, assuming that the present invention is implemented using a Java™-based federated user lifecycle management application, support for a new federation protocol, such as a newly published single-sign-on protocol, can be added by configuring newly developed Java™ classes to the Java™ CLASSPATH of the federated user lifecycle management application, wherein these new classes support the new standard along with the protocol interface for supporting the present invention.

The exemplary federated architecture leverages the existing environment in which a federated user lifecycle management solution is to be integrated. The federated user lifecycle management application can be easily modified to support new protocols/standards as they evolve with minimal changes to the overall infrastructure. Any changes that might be required to support new federated user lifecycle management functionality are located almost exclusively within the federated user lifecycle management application, which would require configuring the federated user lifecycle management application to understand the added functionality.

There may be minimal configuration changes in other federated components, e.g., at a point-of-contact server, in order to allow the overall infrastructure to be able to invoke new federated user lifecycle management functionality while continuing to support existing federated user lifecycle management functionality. However, the federated user lifecycle management applications are functionally independent from the remainder of the federated components in that the federated user lifecycle management applications may require only minimal interaction with other federated components of the federated environment. For example, in an exemplary embodiment, the federated user lifecycle management functionality may integrate with an enterprise-based datastore, e.g., an LDAP datastore, if federated user lifecycle management information, such as NameIdentifier values in accordance with the Liberty Alliance profiles, are to be stored in an externally-accessible federated user lifecycle management datastore as opposed to a private, internal, federated user lifecycle management datastore that is not apparent or accessible to external entities.

Hence, an existing environment needs minimal modifications to support federated user lifecycle management functionality. Moreover, changes to federated user lifecycle management functionality, including the addition of new functionality, have minimal impact on an existing federated environment. Thus, when a new single-sign-on standard is published, support for this standard is easily added.

Traditional user authentication involves interaction between an enterprise's computing environment and the end-user only; the manner in which the enterprise chooses to implement this authentication interchange is the choice of the enterprise, which has no impact on any other enterprise. When federation or cross-domain single-sign-on functionality is desired to be supported, however, it becomes a requirement that enterprise partners interact with each other. This requirement cannot be done scalably using proprietary protocols. Although adding support for standards-based federation protocols directly to a point-of-contact entity seems like a robust solution, the point-of-contact entity, which is already an existing component within the enterprise's computing environment, must be modified; moreover, it must be modified every time that one of these public federation protocols changes. Moving this functionality out of the point-of-contact entity provides a more modular approach, wherein this pluggable functionality makes it easy to maintain migrations or updates to these protocols.

Runtime Linked-User-Account Creation During a Single-Sign-On Operation

Figure 8:
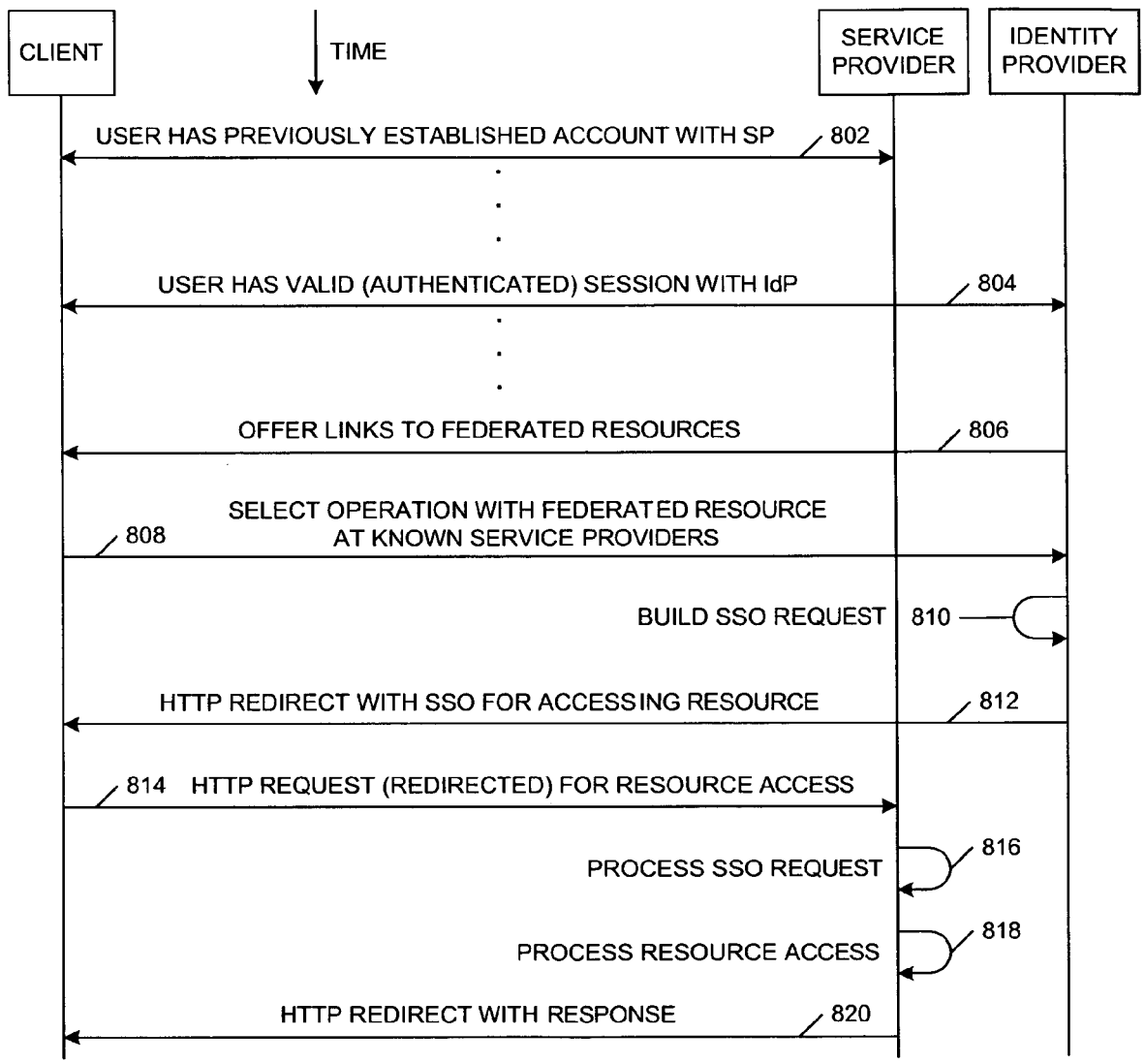
FIG. 8 depicts a dataflow diagram that shows a typical prior art HTTP-redirection-based single-sign-on operation that is initiated by a federated identity provider to obtain access to a protected resource at a federated service provider.

With reference now to FIG. 8, a dataflow diagram depicts a typical prior art HTTP-redirection-based single-sign-on operation that is initiated by a federated identity provider to obtain access to a protected resource at a federated service provider. Although the processes that are illustrated within FIG. 8 and the subsequent figures employ HTTP-based communications, the present invention is not limited to HTTP-based communications, and other communication protocols may be employed; in particular, the present invention is not limited to front-channel communications as represented by HTTP redirection-based techniques but may be equally applied to back-channel techniques, such as SOAP/HTTP or SOAP/MQ. In the dataflow in FIG. 8, the user of a client, also known as a user agent, such as a web browser application, has already established a user account not only at the identity provider but also at the service provider (step 802) and that the user has already authenticated to the identity provider (step 804).

One of the prerequisites for the exemplary dataflow in FIG. 8 is that, at a minimum, that the user already has a federated account with the service provider; in other words, the service provider is required to recognize user identity information for the user when it receives this information from an identity provider in order to perform a single-sign-on operation for the user when initiated by an identity provider. With step 804, the prerequisite is simply that the user has authenticated to the identity provider at some previous point in time and currently has a valid session with the identity provider; there are no requirements on the reasons for which a session was established at step 804. It should be noted that other scenarios are possible, e.g., in which the identity provider determines at some later point in time after some interaction with the user that the identity provider only performs certain operations for authenticated users. It should also be noted that other scenarios for initiating a single-sign-on process are possible; for example, a user could initiate a single-sign-on operation by requesting a protected resource at the service provider, e.g., by using a bookmarked URL within a browser application.

The single-sign-on process commences at the identity provider by sending to the client from the identity provider an offer to provide access to federated resources (step 806); the offer may be in the form of hyperlinks to resources at federated web sites or, more generally, at federated domains, and the offer may be made in the form of an HTTP response message in response to a previous HTTP request message from the client (not shown) to view a particular web page on the identity provider's web site. The user then selects one of the offered federated resources at service providers that are known to the identity provider (step 808); the selection may be facilitated by an HTTP request message from the client to the identity provider.

The identity provider builds a message for requesting access to the selected federated resource on behalf of the user such that the message also includes a single-sign-on request (step 810), and the identity provider sends the resource request with the single-sign-on request to the client (step 812), e.g., in the form of an HTTP redirect message (HTTP Response message with status/reason code "302"). The redirect message redirects the client to the appropriate location, e.g., as identified by a URI within the "Location" header of the redirect message, that identifies the appropriate service at the service provider that controls access to the requested federated resource.

It should be noted that, in the prior art, a preferred manner of initiating a push-type single-sign-on operation is to include the single sign-on assertion information in a request initiated by the identity provider and sent to the service provider in response to a request triggered directly at the service provider. For example, in a computing environment that implements a single-sign-on operation as specified in the Liberty Alliance ID-FF 1.2 specifications, an AuthnResponse is built. In some scenarios, it is required that the identity provider redirect the client to a trigger URL at the service provider, whereafter the trigger URL will cause the service provider to build a message, e.g., an AuthnRequest message within the Liberty Alliance specifications, that is redirected to the identity provider, which in turn causes the identity provider to build response, e.g., an AuthnResponse; this is the means by which a push-based SSO is implemented with Liberty ID-FF 1.1.

The outgoing request message may comprise two distinct requests: one requested operation for a single-sign-on operation on behalf of the user of the client, and another requested operation for accessing the protected resource that has been selected by the user of the client. Alternatively, the request to access the federated resource may include an implicit request to perform a single-sign-on operation for the user such that the single-sign-on process is merely part of a larger process for accessing the selected resource. The manner in which information is provided for the requested single-sign-on operation may vary. For example, the "Location" HTTP header of the redirect message may also include a query component, e.g., appended to a URI and demarcated within the URI with a "?" character, that contains various information, including security tokens for accomplishing the single-sign-on operation.

In response to receiving the redirect message from the identity provider, the client sends an HTTP Get message to the appropriate service at the service provider as indicated by the URI in the HTTP redirect message from the identity provider (step 814). In this manner, the client accesses the appropriate service at the service provider because the URI in the HTTP Get message still contains the attached information that is required by the service at the service provider.

The service provider receives the request message from the client, and assuming that the single-sign-on aspect of the request is successfully completed (step 816) such that the user has an active session at the service provider, the service provider then processes the resource access aspect of the request message (step 818). After processing the request message, the service provider responds by sending an HTTP response message to the client (step 820), thereby concluding the process.

Figure 9A:
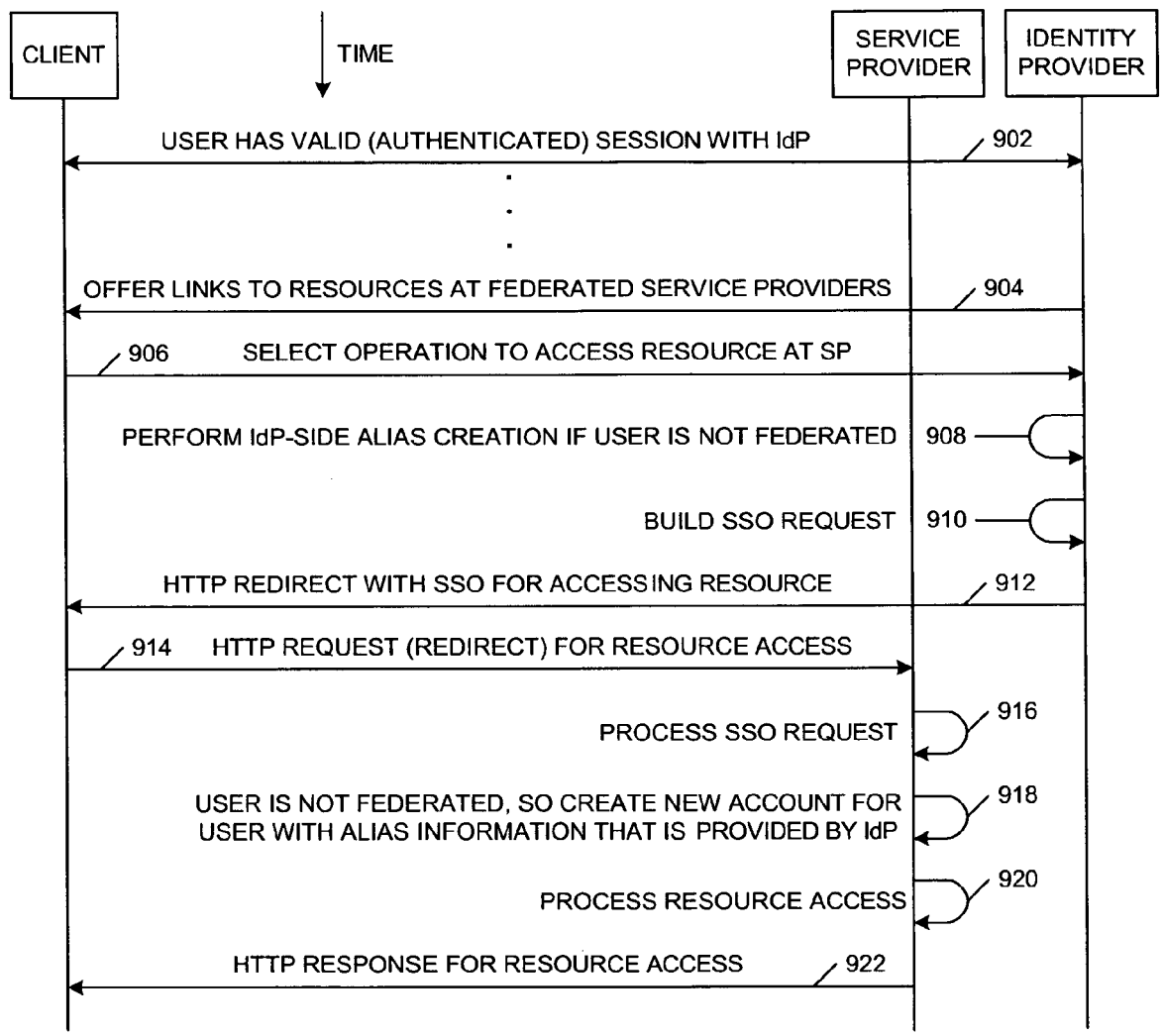
FIGS. 9A-9B depicts dataflow diagrams that show an HTTP-redirection-based single-sign-on operation that is initiated by a federated identity provider to obtain access to a protected resource at a federated service provider while performing a runtime linked-user-account creation operation at the federated service provider in accordance with an embodiment of the present invention.
Figure 9B:
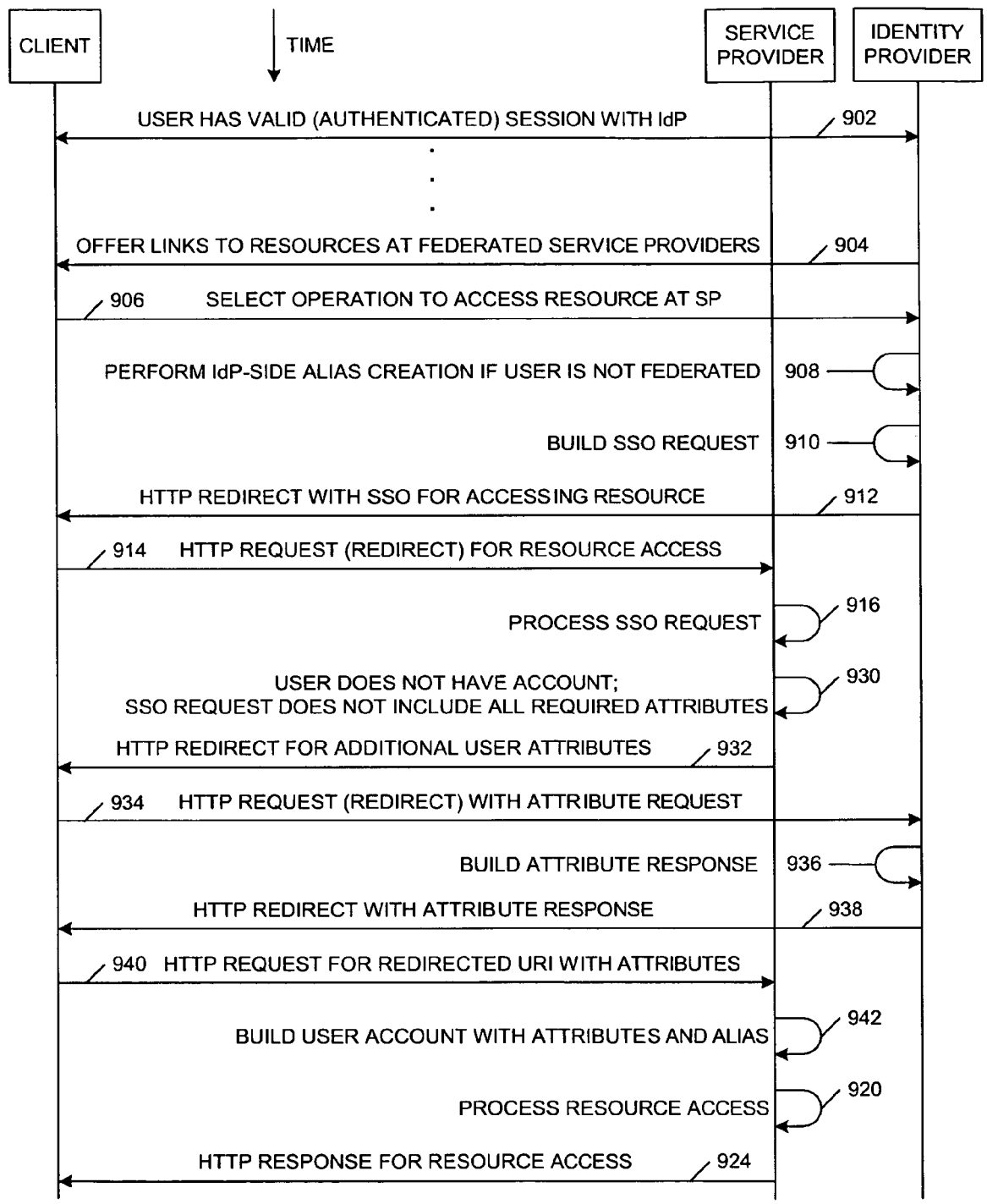

With reference now to FIGS. 9A-9B, dataflow diagrams depict an HTTP-redirection-based single-sign-on operation that is initiated by a federated identity provider to obtain access to a protected resource at a federated service provider while performing a runtime linked-user-account creation operation at the federated service provider in accordance with an embodiment of the present invention. In a manner similar to that shown in FIG. 8, both FIGS. 9A-9B depict a process by which an identity provider may request a single-sign-on operation at a selected service provider. However, whereas FIG. 8 depicts only a generalized single-sign-on operation at step 816, the processes that are shown in FIGS. 9A-9B differs from the process that is shown in FIG. 8 with respect to the single-sign-on operation. Unlike the process that is shown in FIG. 8, there is no prerequisite to the processes that are shown in FIGS. 9A-9B that the user of a client has already established a user account at the service provider.

More specifically, prior art solutions for single-sign-on operations have certain prerequisites, namely that the service provider and the identity provider must both recognize the user, and they must have an agreed-upon means of referring to this user, i.e. an alias identifier, or more simply, an alias; both prerequisites must be true before the initiation of a single-sign-on operation in order for the single-sign-on operation to be successful, otherwise it would fail. In these prior art solutions, the alias is included in the single-sign-on response that is sent from the identity provider to the service provider and used by the service provider to identify the user and build a session for the user. These prerequisites exist within prior art solutions whether: (a) the single-sign-on operation is triggered by the service provider, e.g., when a user accesses a protected resource that is hosted at the service provider and the service provider needs a session for the user, thereby initiating a single-sign-on operation by sending a request to an identity provider; or (b) the single-sign-on operation is triggered by the identity provider, e.g., when an identity provider has a list of linked resources that are hosted by related service providers, and after a user selects one of these links, a single-sign-on operation is initiated by the identity provider. In contrast, the present invention eliminates these prerequisites, as shown by multiple exemplary embodiments of the present invention that are described hereinbelow.

Referring to FIG. 9A, the user has already authenticated to the identity provider (step 902). With step 902, the user has authenticated to the identity provider at some previous point in time and currently has a valid session with the identity provider; there are no requirements on the reasons for which a session was established at step 902. It should be noted that other scenarios for initiating a single-sign-on operation may have a different sequence of steps. For example, a user might browse information that is provided by an identity provider without an authenticated session; at some later point in time after some interaction with the user, the user requests a resource such that the identity provider determines that the identity provider only performs certain operations for authenticated users, thereafter initiating an authentication operation with the user.

The single-sign-on process commences at the identity provider by sending to the client from the identity provider an offer to provide access to federated resources (step 904); the offer may be in the form of hyperlinks to resources at federated web sites or, more generally, at federated domains, and the offer may be made in the form of an HTTP response message in response to a previous HTTP request message from the client (not shown) to view a particular web page on the identity provider's web site. The user then selects one of the offered federated resources at service providers that are known to the identity provider (step 906); the selection may be accomplished by an HTTP request message from the client to the identity provider.

If the user does yet have a federated identity that may be used for a federated single-sign-on operation, then the identity provider creates an alias for the user (step 908). The identity provider builds a message for requesting access to the selected federated resource on behalf of the user such that the message also includes a single-sign-on request (step 910), i.e. a push-type single-sign-on request. A push-type single-sign-on request originates with an identity provider and is pushed to a service provider in an unsolicited manner in order to provide the service provider with information that authenticates a user identity; in contrast, a pull-type single-sign-on request originates with a service provider that is attempting to pull authentication information for a user in a solicited manner. Alternatively, a push-type single-sign-on operation can be emulated, particularly when a push-type single-sign-on operation is not supported explicitly. An emulated push-type single-sign-on operation occurs when an identity provider issues a request to a service provider, e.g., via a specialized service at the service provider such as an intersite transfer service, whereupon the service provider issues a single-sign-on request to the identity provider; after the identity provider responds to the request from the service provider, the processing steps are the same as if an explicit push-type single-sign-on operation has occurred.

The identity provider sends the resource request with the single-sign-on request to the client (step 912), e.g., in the form of an HTTP redirect message (HTTP Response message with status/reason code "302"). The redirect message redirects the client to the appropriate location, e.g., as identified by a URI within the "Location" header of the redirect message, that identifies the appropriate service at the service provider that controls access to the requested federated resource. In response to receiving the redirect message from the identity provider, the client sends an HTTP Get message to the appropriate service at the service provider as indicated by the URI in the HTTP redirect message from the identity provider (step 914).

The service provider receives and processes the received request message from the client (step 916). At step 916, the service provider retrieves from the received message an alias identifier or alias information that has been associated with the user by the identity provider but which is not recognized by the service provider as being associated with a previously existing user account at the service provider. Hence, at step 916, the service provider determines that the user does not have a user account that links the user with the identity provider, i.e. a linked user account that informs the service provider that the service provider should accept information for a single-sign-on operation from the identity provider in order to authenticate the user. In other words, at step 916, the service provider determines that the service provider does not have a user account that links a user account at the service provider with a user account at the identity provider.

This recognition is significant for the following reasons. It should be noted that the user may already have one or more accounts at the service provider. These accounts may be used independently because a unique user account is based on a unique user identifier; given a user identifier, the service provider determines the privileges that are associated with the user identifier, i.e. a particular user account. Given that a linked user account is independent of any other user account that the user may have at the service provider, and given that a linked user account requires a unique user identifier to be associated with the linked user account, a linked user account is based on a user identifier that is independent and unique in comparison with any other user identifier that is known to the service provider; this particular user identifier is known as an alias identifier, although some form of alias information within multiple data variables may be used in place of a single alias data variable in some embodiments.

Therefore, after the service provider recognizes that a provided alias identifier is not associated with a previously existing user account at the service provider, the service provider begins to perform operations in order to ensure that the single-sign-on operation is performed successfully. Since the user had not yet been federated with the service provider, the service provider creates a new account for the user with the alias information that has been provided by the identity provider within the request message (step 918) such that the user has an active session at the service provider.

It should be noted that the minimum information required to create this account will be any local information that is required to identify the account (which is generated internally by the service provider) and any alias information that is provided by the identity provider; thereafter, the newly created user account is linked to the identity provider based on the provided alias for the user such that the service provider is able to perform a single-sign-on operation on behalf of the user in cooperation with the identity provider. If the request to the service provider includes user attributes as well as an alias identifier for the user, then these attributes may be added to the local account; however, it should be noted that, in some embodiments, the service provider may create a linked user account using only the alias identifier without any additional user attribute information from the identity provider, possibly by assigning a local set of default user attributes that are determined by the service provider and that are independent of any information that is received from the identity provider. Whether any additional attributes are provided or not, what should be noted is that this account would preferably not be enabled for direct authentication; hence, the only manner for the user to gain access to resources at the service provider would be as the result of a session established from a single-sign-on operation triggered by the identity provider.

After the linked user account has been created, the service provider then performs the requested resource access (step 920). After performing the resource access, the service provider responds by sending an HTTP response message to the client (step 922), thereby concluding the process.

The single-sign-on operation of the present invention, e.g., the embodiment that is shown in FIG. 9A, differs from the single-sign-on solutions of the prior art, e.g., the operation that is shown in FIG. 8, because the service provider recognizes during the single-sign-on operation of the present invention that the service provider does not have a user account for the user that links the user to an account at an identity provider in order to support single-sign-on operations, yet with the present invention the service provider is able to dynamically perform operations to allow the single-sign-on operation to proceed. More specifically, the service provider does not have, e.g., within its user registries or databases, enough information that allows the service provider to determine the user's local identity, and therefore the user's privileges, for the single-sign-on operation; without this information, the service provider cannot determine the appropriate set of privileges to be given to the user and, therefore, the type of session/access control rights to give the user, if the service provider were to allow the single-sign-on operation to proceed. In the prior art, the service provider cannot automatically create an active session for the user and allow access to protected resources; with the present invention, the service provider dynamically performs a runtime linked-user-account creation operation at the service provider by creating a linked user account based on the user identity, and possibly attribute information, that has been provided by the identity provider to the service provider, e.g., as provided in a request that has been redirected from the identity provider through the client. The service provider is willing and able to perform such operations based on its trust relationship with the identity provider with their federated computing environment. In this manner, the single-sign-on request can be fulfilled by the service provider, which results in the creation of an active session for the user, and the request for access to the protected resource can proceed.

In a manner similar to that shown in FIG. 9A, FIG. 9B depicts a process by which an identity provider may request a single-sign-on operation at a selected service provider; similar elements in the figures are identified by similar reference numerals. However, whereas FIG. 9A depicts only a generalized runtime user account creation operation at step 918, the process that is shown in FIG. 9B differs from the process that is shown in FIG. 9A with respect to the runtime linked-user-account creation operation, which stretches over steps 930-942 in FIG. 9B. Unlike the process that is shown in FIG. 9A, in the process that is shown in FIG. 9B, the service provider is not able to immediately create, or to complete immediately the creation of, a user account at the service provider based on the information that has been provided by the identity provider to the service provider.

Referring now to FIG. 9B, the single-sign-on processing in FIG. 9B (step 930) differs because the service provider recognizes during the single-sign-on operation that the service provider does not have a pre-existing user account for the identity that is claimed or asserted in the single-sign-on request from the identity provider, i.e. a pre-existing user account that links the service provider to the identity provider on behalf of the user, and further that the information contained in the single-sign-on request is not sufficient to create a valid account at the service provider. Thus, the service provider recognizes that it requires additional information about the user from the identity provider. More specifically, the service provider does not have sufficient user attribute information to create an active account for the user; for example, there may be attributes that are required by the service provider but were not included in the received single-sign-on request. Because of these additional requirements, the service provider is not yet able to create, or to completely create, whatever user account registry/database entries that it requires based on the information it has received.

In the embodiment that is shown in FIG. 9B, the service provider responds by sending an HTTP redirect message (HTTP Response message with status/reason code "302") to the client (step 932); the message from the service provider contains a request for additional user attribute information. The redirect message redirects the client to the identity provider using a return URI that was previously provided by the identity provider to the service provider. In response to receiving the redirect message from the service provider, the client sends an HTTP Get message to the identity provider as indicated by the URI in the HTTP redirect message from the service provider (step 934).

The identity provider then processes the received message (step 936) to build a response that contains user attribute information that is stored by the identity provider about the user of the client. The manner in which specific user attributes are identified may vary. For example, the user attribute information that is provided by the identity provider may include user attribute information that was explicitly requested by the service provider. Additionally or alternatively, the user attribute information that is provided by the identity provider may include user attribute information that was implicitly requested by the service provider, i.e. user attribute information that has been determined by the identity provider to be sufficient for performing a user account creation operation at the service provider. In addition, the identity provider may perform an operation to reconcile the received request for additional user attribute information with the identity provider's previous single-sign-on request to ensure that a service provider is not attempting to obtain user attributes without sufficient reason to do so.

After the identity provider builds the message at step 936, the identity provider sends the message with the additional user attributes to the client (step 938), e.g., in the form of an HTTP redirect message (HTTP Response message with status/reason code "302"). The redirect message redirects the client to the appropriate location, e.g., as identified by a URI within the "Location" header of the redirect message, that identifies the appropriate service at the service provider; the appropriate location may have been provided by the service provider in its request for the additional user attributes. In response to receiving the redirect message from the identity provider, the client sends an HTTP Get message to the appropriate service at the service provider as indicated by the URI in the HTTP redirect message from the identity provider (step 940).

Given the additional user attribute information in the received message, the service provider performs a runtime linked-user-account creation operation at the service provider (step 942) by creating a linked user account based on the received user attribute information; in this manner, the single-sign-on request (and any subsequent single-sign-on requests) can be fulfilled by the service provider, which also creates an active session for the user, and the request for access to the protected resource can proceed at steps 920 and 924. In some embodiments, the service provider may preliminarily create the user account yet postpone the completion of the creation of the user account; in these embodiments, the service provider completes the creation of the user account at step 942. It should be noted that the processes are described in the context of an HTTP redirection-based attribute retrieval, but these processes could be implemented with a back-channel approach, such as a SOAP/HTTP-based SAML attribute query from the service provider to the identity provider.

Figure 9C:
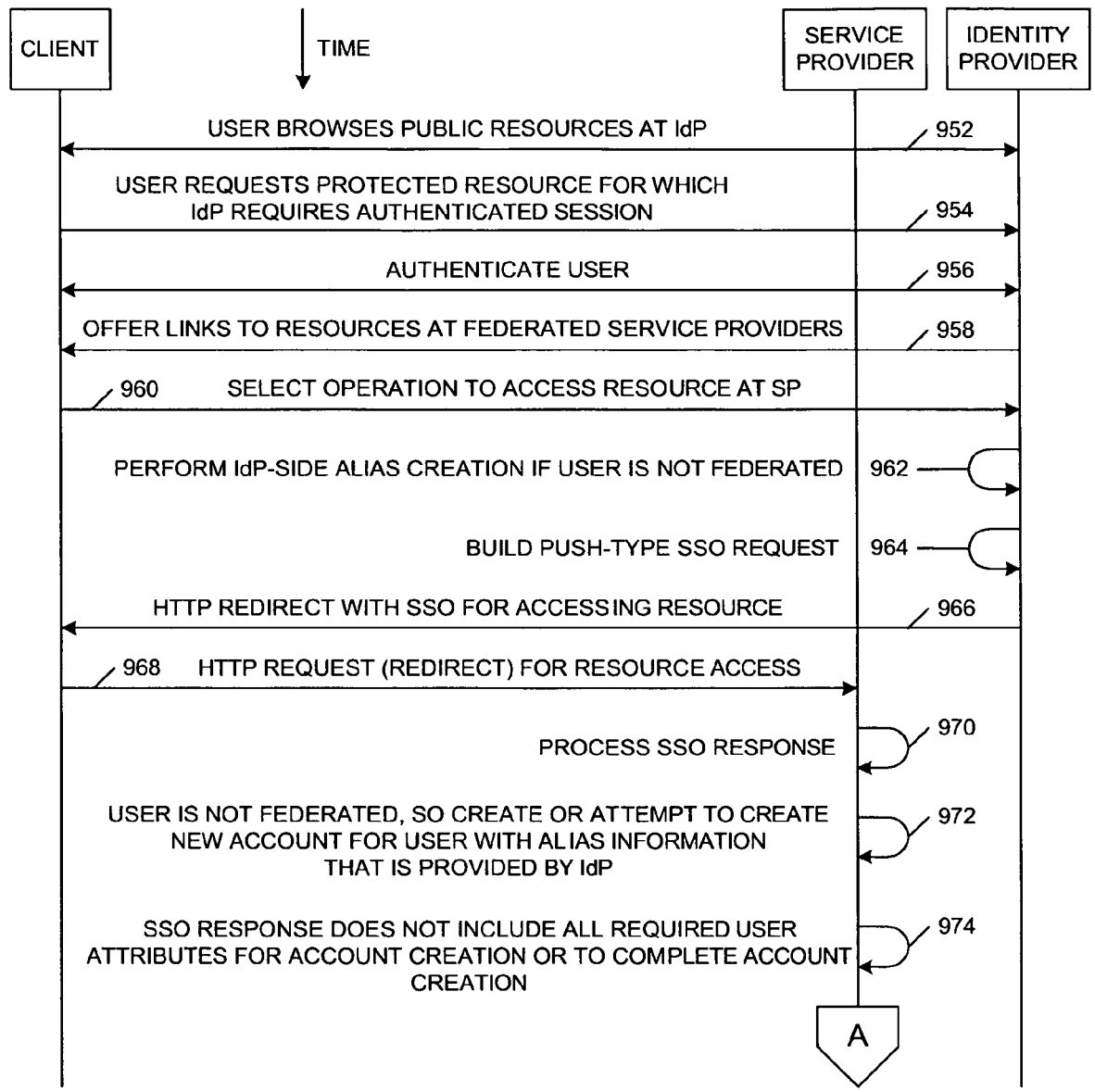
FIGS. 9C-9E depict dataflow diagrams that show an HTTP-redirection-based single-sign-on operation that is initiated by a federated identity provider to obtain access to a protected resource at a federated service provider with alternative methods for obtaining user attributes by the federated service provider in accordance with an embodiment of the present invention.
Figure 9D:
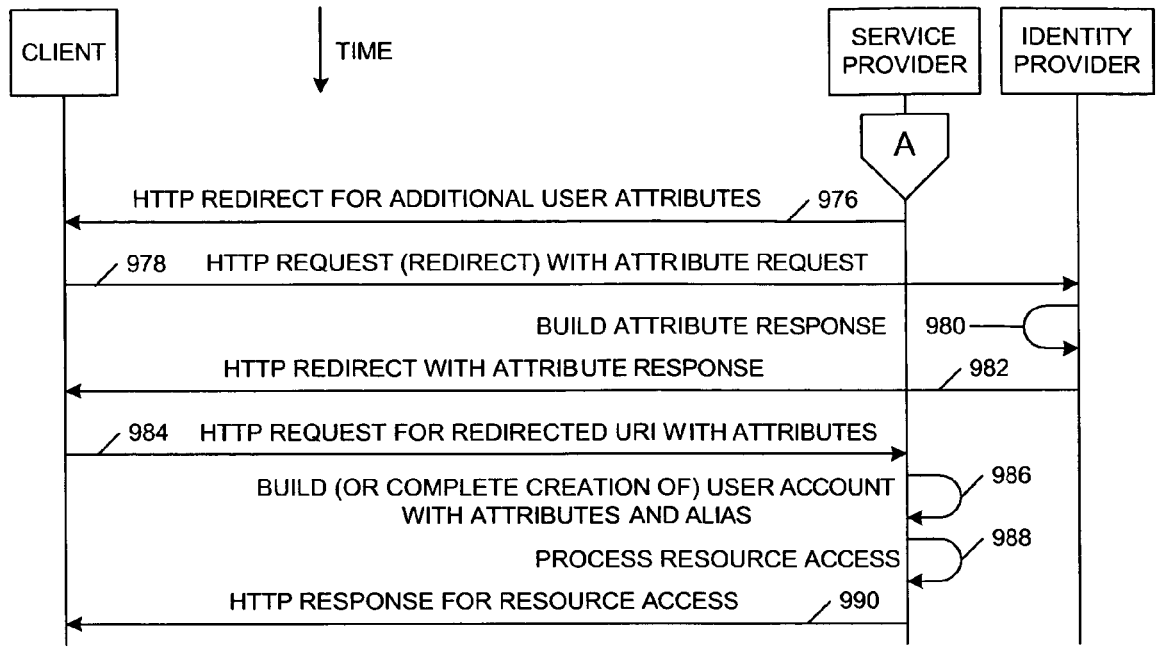
Figure 9E:
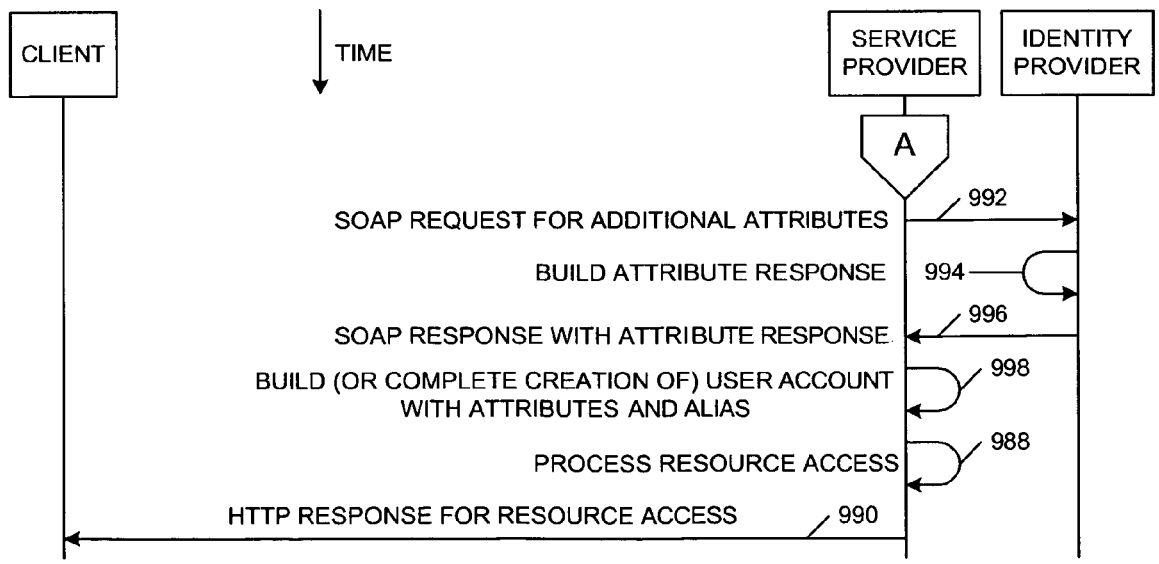

With reference now to FIGS. 9C-9E, dataflow diagrams depict an HTTP-redirection-based single-sign-on operation that is initiated by a federated identity provider to obtain access to a protected resource at a federated service provider with alternative methods for obtaining user attributes by the federated service provider in accordance with an embodiment of the present invention. The processes that are shown in FIGs. FIGS. 9C-9E differ from the processes that are shown in FIGS. 9A-9B primarily in the manner in which the service provider obtains user attributes during a single-sign-on operation; the processes that are shown in FIGS. 9A-9B and in FIGS. 9C-9E are both initiated by an identity provider. In addition, in the dataflow that is shown in FIG. 9B, a service provider performs the runtime linked-user-account creation operation at step 942; in contrast, in the dataflow that is shown in FIGS. 9C-9E, the service provider may perform the runtime linked-user-account creation operation over multiple steps by partially creating a linked user account and then later completing the runtime linked-user-account creation operation, as described in more detail hereinbelow.

Referring now to FIG. 9C, the process commences with a user browsing public resources that are hosted by an identity provider (step 952), i.e. resources that are not protected resources that require an authentication operation with respect to the user prior to accessing the resources. At some subsequent point in time, the user's client sends to the identity provider a request for access to a protected resource that requires an authentication operation (step 954); for example, the user might attempt to browse information that the identity provider maintains about resources at service providers within a federated computing environment in which the identity provider participates with service providers, i.e. the identity provider's federated partners. In response to the user request, the identity provider performs an authentication operation with the user (step 956). In this example, the identity provider thereafter offers links to resources at federated service providers (step 958), and the user then selects or initiates an operation to access a resource at a service provider (step 960).

If the user does yet have an alias identifier that may be used for a federated single-sign-on operation, then the identity provider creates an alias for the user (step 962), which may include performing other operations to associate the alias identifier with the user, particular to associate the alias identifier with other information that is associated with the user, e.g., user attribute information. The identity provider builds a message for requesting access to the selected federated resource on behalf of the user such that the message also includes a single-sign-on request (step 964), i.e. a push-type single-sign-on request. The identity provider sends the resource request with the single-sign-on request to the client (step 966), e.g., in the form of an HTTP redirect message (HTTP Response message with status/reason code "302"). The redirect message redirects the client to the appropriate location, e.g., as identified by a URI within the "Location" header of the redirect message, that identifies the appropriate service at the service provider that controls access to the requested federated resource. In response to receiving the redirect message from the identity provider, the client sends an HTTP Get message to the appropriate service at the service provider as indicated by the URI in the HTTP redirect message from the identity provider (step 968).

The service provider then processes the single-sign-on response (step 970), which may include, e.g., extracting the newly created alias identifier for the user and extracting any user attribute information about the user that has been preliminarily provided by the identity provider to the service provider. The service provider attempts to create a new user account (step 972) but either is not able to immediately create or is not able to create a fully appropriate user account at the service provider based on the federated user identity information that has been provided by the identity provider to the service provider in the single-sign-on response. In other words, depending on the implementation, the service provider either fails to create or determines that it cannot create a user account at this point in time, or the service provider creates a user account with limited-time or limited-access privileges. More specifically, the service provider does not have, e.g., within the combination of its user registries or databases and the information that is initially provided by the identity provider, the information required to allow the service provider to determine the user's appropriate set of privileges; without this information, the service provider cannot determine the type of session/access control rights to give the user. Hence, the service provider recognizes during the single-sign-on operation that the service provider does not yet have a linked user account for the user while also recognizing that the service provider requires additional information about the user from the identity provider (step 974).

The manner in which the service provider pulls additional user attribute information from the identity provider to complete the user account creation operation may vary; two examples of variations are shown in FIG. 9D and in FIG. 9E. FIG. 9D illustrates a front-channel attribute retrieval operation, whereas FIG. 9E illustrates a back-channel attribute retrieval operation. Hence, the data flow diagram that is shown in FIG. 9C continues into either FIG. 9D or FIG. 9E; in both cases, the dataflow diagrams in FIG. 9D and FIG. 9E conclude with similar steps that are denoted with similar reference numerals.

Referring now to FIG. 9D, the service provider responds to its determination of its lack of user attribute information by sending an HTTP redirect message (HTTP Response message with status/reason code "302") to the client (step 976); the message from the service provider contains a request for additional user attribute information. The redirect message redirects the client to the identity provider using a return URI that was previously provided by the identity provider to the service provider. In response to receiving the redirect message from the service provider, the client sends an HTTP Get message to the identity provider as indicated by the URI in the HTTP redirect message from the service provider (step 978). The identity provider then processes the received message (step 980) to build a response that contains user attribute information that is stored by the identity provider about the user of the client. The manner in which specific user attributes are identified may vary. For example, the user attribute information that is provided by the identity provider may include user attribute information that was explicitly requested by the service provider. Additionally or alternatively, the user attribute information that is provided by the identity provider may include user attribute information that was implicitly requested by the service provider, i.e. user attribute information that has been determined by the identity provider to be sufficient for performing a user account creation operation at the service provider. In addition, the identity provider may perform an operation to reconcile the received request for additional user attribute information with the service provider's previous single-sign-on request to ensure that a service provider is not attempting to obtain user attributes without sufficient reason to do so.

After the identity provider builds the message at step 980, the identity provider sends the message with the user attributes to the client (step 982), e.g., in the form of an HTTP redirect message (HTTP Response message with status/reason code "302"). In response to receiving the redirect message from the identity provider, the client sends an HTTP Get message to the appropriate service at the service provider as indicated by the URI in the HTTP redirect message from the identity provider (step 984).

Given the user attribute information in the received message, the service provider performs or completes a user account creation operation at the service provider (step 986) based on the received user attribute information; in this manner, the single-sign-on request can be fulfilled by the service provider, which also creates an active session for the user, and the request for access to the protected resource can proceed. In both FIG. 9D and FIG. 9E, the service provider provides access to the originally requested protected resource (step 988), and the service provider sends an HTTP Response message to the client that contains information that is derived from accessing the protected resource (step 990), thereby concluding the process.

Referring now to FIG. 9E, the service provider responds to its determination of its lack of user attribute information by sending a SOAP message directly from the service provider to the identity provider (step 992); the message from the service provider contains a request for required user attribute information. The identity provider then processes the received message (step 994) to build a response that contains user attribute information that is stored by the identity provider about the user of the client; again, the manner in which specific user attributes are identified may vary as described above. The identity provider sends a SOAP response message with the required user attributes to the client (step 996). Given the user attribute information in the received message, the service provider performs or completes a runtime user account creation operation at the service provider (step 998) based on the received user attribute information; in this manner, the single-sign-on request can be fulfilled by the service provider, which also creates an active session for the user, and the request for access to the protected resource can proceed at steps 988 and 990.

Figure 10:
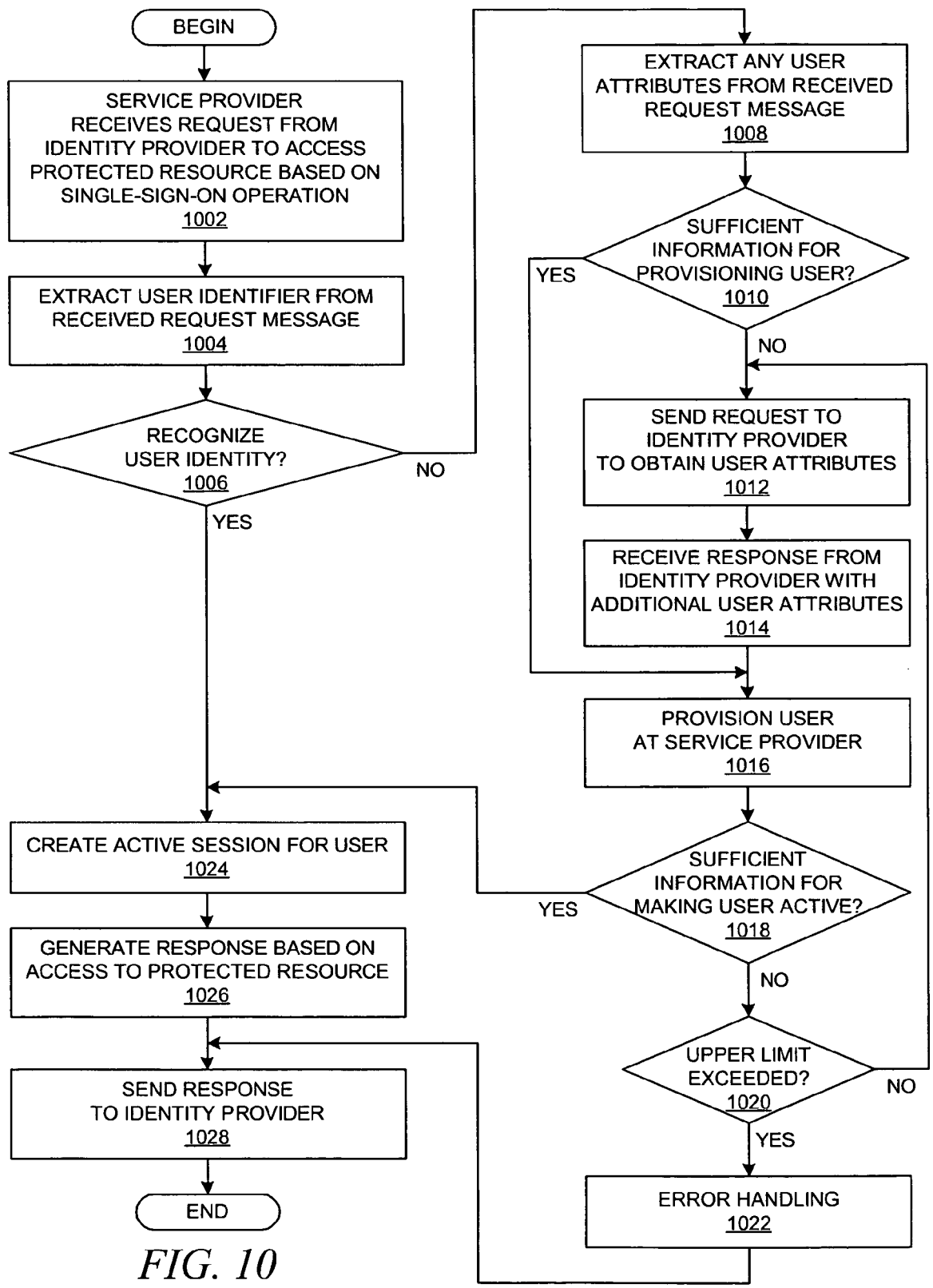
FIG. 10 depicts a flowchart that shows a more detailed process for performing a runtime linked-user-account creation operation at a service provider during a single-sign-on operation that has been initiated by an identity provider.

With reference now to FIG. 10, a flowchart depicts a more detailed process for performing a runtime linked-user-account creation operation at a service provider during a single-sign-on operation that has been initiated by an identity provider. The flowchart that is shown in FIG. 10 depicts a service-provider-centered perspective for some of the processing that occurs at a service provider within the dataflow diagram that is shown in FIG. 9B.

The process commences when the service provider receives a request from an identity provider to access a protected resource at the service provider on behalf of a user of a client based on a single-sign-on operation (step 1002). It should be noted that the protected resource may be an endpoint that corresponds to the service provider's functionality for fulfilling a single-sign-on request; in other words, it is possible that the request from the identity provider is redirected directly to the known functionality to accomplish the single-sign-on operation because the user has not requested a particular back-end resource but simply overall access to the service provider. The service provider extracts a user identifier from the received request message (step 1004) and makes a determination as to whether or not the user identifier is recognized (step 1006).

If the user identifier is not recognized by the service provider, then the service provider cannot create an active session with the appropriate security considerations for protected access to its hosted computational resources. The service provider extracts any user attribute information that might be embedded in the received message (step 1008), and a determination is made as to whether or not the service provider has sufficient information about the user to create a user account for the user at that time (step 1010), e.g., as would be required to generate an entry into a user registry or whatever operations are typically performed by the service provider to create a local user account for the user at the service provider.

If the service provider does not have sufficient information about the user to create a user account for the user, the service provider may send a request to the identity provider to obtain additional user attribute information (step 1012); this may be performed in a synchronous or asynchronous manner. The service provider subsequently receives additional user attributes from the identity provider (step 1014).

It should be noted that an embodiment of the present invention may be implemented such that a user attribute retrieval operation by a service provider may be performed with respect to an attribute information provider. For example, a service provider may send a request for user attributes to an attribute information provider rather than an identity provider. Alternatively, a service provider may send a request for user attributes to an identity provider, which subsequently enlists assistance by sending a request to an attribute information provider, thereby acting as an intermediate trusted agent on behalf of the service provider. Additional information about the usage of an attribute information provider within the context of a federated computing environment may be found in Blakley et al., "Method and system for user-determined attribute storage in a federated environment", U.S. Patent Application Publication US 2004/0128378 A1, published Jul. 1, 2004, based on U.S. patent application Ser. No. 10/334,605, filed Dec. 31, 2002, which has a common assignee with the present patent application and is hereby incorporated by reference.

After receiving the additional user attributes at step 1014, or based on any user attribute information that may have been within the original request as extracted at step 1008, the service provider performs a linked user account creation operation (step 1016); as noted above, the operations that are performed to create a linked user account for the user at the service provider may vary. After the linked user account has been created at the service provider, the service provider may be able to proceed with the processing of the original request.

The service provider then determines whether there is sufficient information for activating the newly created account for the user (step 1018). If the service provider does not yet have sufficient information for activating the user's account, then a determination is made as to whether the service provider has already made too many attempts to obtain user attributes for activating the user account (step 1020); if not, then the process branches back to step 1012 to make an attempt to obtain the necessary user attributes. Otherwise, the service provider performs some type of error handling (step 1022), which may entail sending an error response back to the identity provider.

If the service provider has sufficient information for activating the user's account at step 1018, then the service provider creates an active session for the user (step 1024), either based on a successful authentication of a recognized user identity at step 1006 or based on the newly created user identity at step 1016. The service provider then generates a response for the original request to access the protected resource (step 1026), and the response is sent by the service provider to the identity provider (step 1028), thereby concluding the process.

The exemplary dataflow that is described with respect to FIG. 9B or the exemplary process that is described with respect to FIG. 10 can be described in the context of the exemplary data processing systems that are shown in FIG. 7 or in FIG. 3.

In order to perform a single-sign-on operation, the identity and attribute service (I&AS) 356 or 718 needs to be able to recognize a user identity from a single-sign-on request within a user registry in some manner. The user registry can be a local registry, e.g., private to the installation of the federated functionality, such as federation user registry 358 or 720, or it could be an enterprise registry that is shared by other applications within an enterprise, such as enterprise user registry 338 or 722. The user account information or user registry information needs to allow I&AS 356 or 718 to build the appropriate information that identifies the user locally. This information may be represented by a username, a set of attributes, e.g., groups and/or roles and/or entitlements, or an opaque identifier, e.g., a NameIdentifier as described within the Liberty Alliance specifications. If the information asserted by the identity provider about the user for which a single-sign-on is being requested cannot be found within a local registry, then I&AS 356 or 718 is not able to build information about the user in a local manner, e.g., to create valid credentials that are used by entities within the local enterprise; in addition, the point-of-contact server 342 or 702 is not able establish a session for the user, and the user is not able to access protected resources.

The present invention provides a mechanism to prevent the generation of some form of error code for an unrecognized user as would be performed in prior art approaches. In the embodiment of the present invention that is shown in the figures, I&AS 356 or 718 may attempt to create a user account, record, or entry, as appropriate for the data storage requirements of the enterprise when the received user identity information is unrecognized. I&AS 356 or 718 performs these operations based on the trust relationship between the federated partners of the identity provider and the service provider, e.g., as provided for within a configured policy that allows for this type of action. The user identity information that is received in the original request may be an actual username value or an opaque data value such as a Liberty Alliance NameIdentifier; this user identity information may be used as a pointer into a user registry from which this user's information would be accessed at some subsequent point in time, or it may be used in a temporary manner until permanent data records are created, e.g., as a pointer into a cache that contains temporary information.

If the original single-sign-on request contains attribute data about a user, then the attribute information may be added directly to a user registry when creating a user account for the user locally. However, the originally received request does not necessarily contain all of the information that is required locally to create a user account for the user. In this case, I&AS 356 or 718 working with single-sign-on protocol service (SPS) 354 or 716 may issue an attribute query, such as a SAML attribute query and/or a WS-AttributeService request, to the user's identity provider to retrieve additional information about the user. As a result, the service provider is able to create a user account for the user in a runtime manner, i.e. while the single-sign-on operation is suspended or, from another temporal viewpoint, concurrently with or as part of the single-sign-on operation.

The level of trust that is accorded to this type of runtime linked-user-account creation operation by the service provider may vary; it is not necessarily the case that all service providers would be willing to allow a completely automated, dynamically determined, linked-user-account creation operation. Hence, in some cases, a service provider may require that a local workflow operation must be undertaken, e.g., a type of local administrative approval process. Rather than directly creating a user account for a user in a completely automated process, the federated user lifecycle management (FULM) application/service 352 or 708 might store the user information, including additional, out-of-band-retrieved user attributes, into some form of local datastore, which may, in turn, trigger a local workflow/approval process. This requirement allows a administrative user at the service provider to approve the creation of the user account in accordance with local policy requirements, etc. As a result, the runtime user account creation operation may be asynchronous, in which case the service provider may send a message to the user to indicate that an account is being created for the user at the service provider and to indicate that the user can attempt to perform a login operation at the service provider at some subsequent point in time. If the user needs to be added to more than an I&AS-accessible user registry, then FULM service 352 or 708 may send this information to a local datastore, from which a local user account creation process is initiated; in this case, accounts/records can be created for the user in multiple destinations in addition to a local I&AS-accessible datastore. It should be noted that the service provider may choose to grant the user a limited-time, limited-access session, thereby restricting the user to a subset of accessible resources rather than a complete set of resources until some later event, e.g., completion of some type of workflow process for approving broader access, or until some later determination is made as to the privileges that should be given to the user; thereafter, the user account would be created with an appropriate level of access to resources.

Figure 11A:
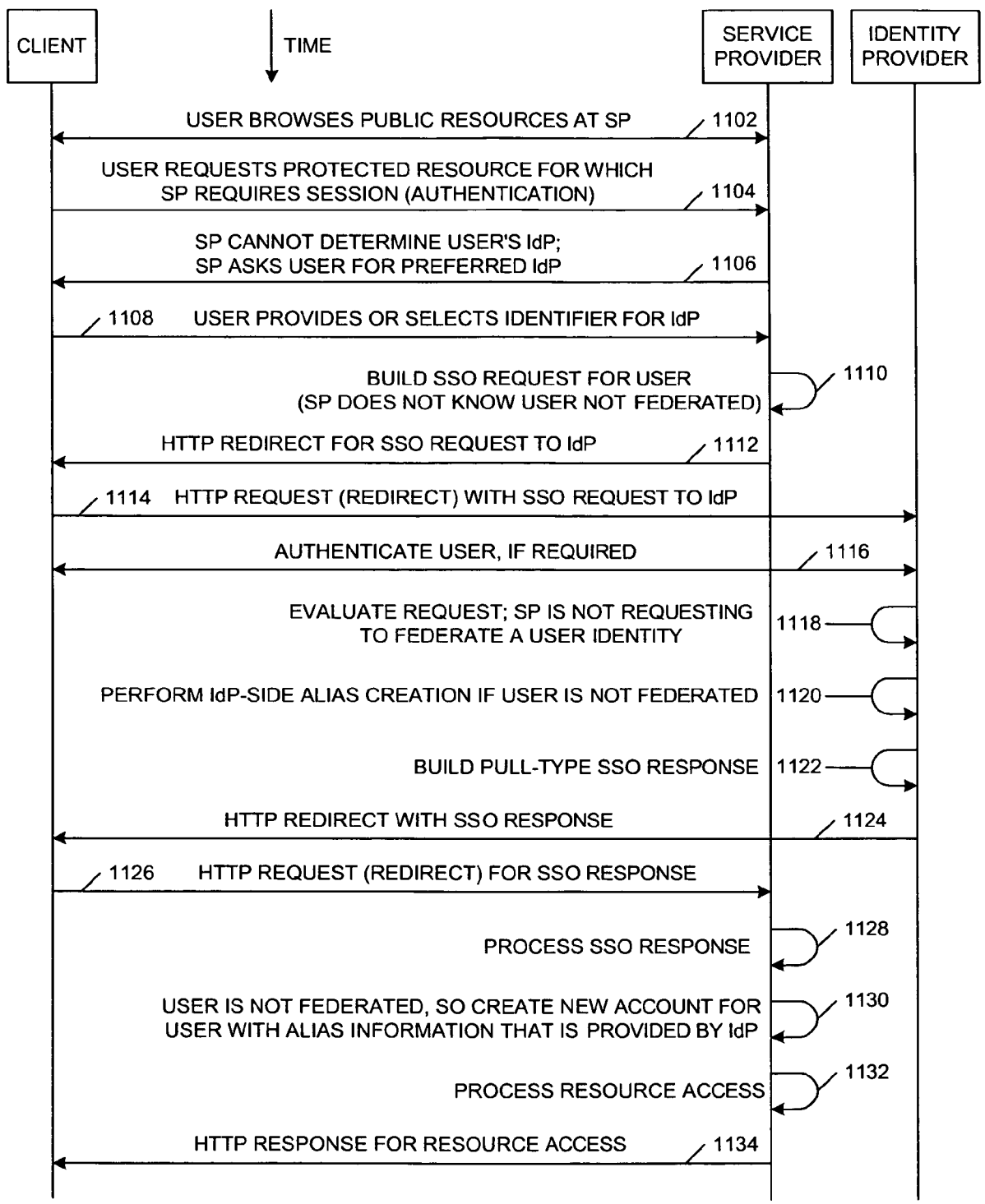
FIG. 11A depicts a dataflow diagram that shows an HTTP-redirection-based pull-type single-sign-on operation that is initiated by a federated service provider to allow access to a protected resource at the federated service provider while performing a runtime linked-user-account creation operation at the federated service provider in accordance with an embodiment of the present invention.

With reference now to FIG. 11A, a dataflow diagram depicts an HTTP-redirection-based pull-type single-sign-on operation that is initiated by a federated service provider to allow access to a protected resource at the federated service provider while performing a runtime linked-user-account creation operation at the federated service provider in accordance with an embodiment of the present invention. The processes that are shown in FIGS. 11A-11D differ from the processes that are shown in FIGS. 9A-9B primarily in the perspective of the origination of the single-sign-on operation; the processes that are shown in FIGS. 9A-9B are initiated by an identity provider, whereas the processes that are shown in FIGS. 11A-11D are initiated by a service provider.

Referring now to FIG. 11A, the process commences with a user browsing public resources that are hosted by a service provider (step 1102), i.e. resources that are not protected resources that require an authentication operation with respect to the user prior to accessing the resources. At some subsequent point in time, the user's client sends to the service provider a request for access to a protected resource that requires an authentication operation (step 1104). The service provider recognizes that it does not have an identifier for the user's preferred identity provider, and the service provider prompts the user to provide the information in some manner (step 1106), e.g., through user-selectable controls in a web page. The client then sends to the service provider the appropriate information about the preferred identity provider as selected by the user (step 1108).

The service provider then builds a pull-type single-sign-on request for the user (step 1110). In this example, the service provider assumes that the user is a federated user, e.g., by assuming that the identity provider maintains some type of federated alias identifier for the user. The service provider sends the single-sign-on request to the client (step 1112), e.g., in the form of an HTTP redirect message (HTTP Response message with status/reason code "302"). In response to receiving the redirect message from the service provider, the client sends an HTTP Get message to the identity provider as indicated by the URI in the HTTP redirect message from the service provider (step 1114).

In response to receiving the pull-type single-sign-on request, the identity provider performs an authentication operation with the client with respect to the user of the client, if required (step 1116); for example, the authentication operation may not be required if the user is already logged on at the identity provider, i.e. if the user already has an active session at the identity provider. The identity provider evaluates the received request (step 1118), and the identity provider determines that the service provider has not provided a user identity to the identity provider as part of the federation request. If the identity provider further determines that the user does not yet have a federated identity, then the identity provider creates a federated identity for the user, e.g., an alias identifier for the user (step 1120). The identity provider builds a pull-type single-sign-on response (step 1122) that contains the newly created, federated identity for the user and optionally contains additional user attribute information that is managed by the identity provider about the user; this pull-type single-sign-on response may or may not have the same data format characteristics as a push-type single-sign-on response. The identity provider sends the single-sign-on response to the client (step 1124), e.g., in the form of an HTTP redirect message (HTTP Response message with status/reason code "302"). In response to receiving the redirect message from the identity provider, the client sends an HTTP Get message to the service provider as indicated by the URI in the HTTP redirect message from the identity provider (step 1126).

The service provider then processes the single-sign-on response (step 1128), which may include, e.g., extracting the newly created federated identifier for the user and may also include the extraction of additional user attribute information about the user. The service provider then creates a new linked user account for the user with the federated identifier that was provided by the identity provider (step 1130), which may possibly also entail using some user attribute information about the user from the identity provider if the identity provider has sent such information and if the service provider needs this information while creating the new user account. After the user has an active session based on the newly created user account, the service provider provides access to the originally requested protected resource (step 1132), and the service provider sends an HTTP Response message to the client that contains information that is derived from accessing the protected resource (step 1134), thereby concluding the process.

Figure 11B:
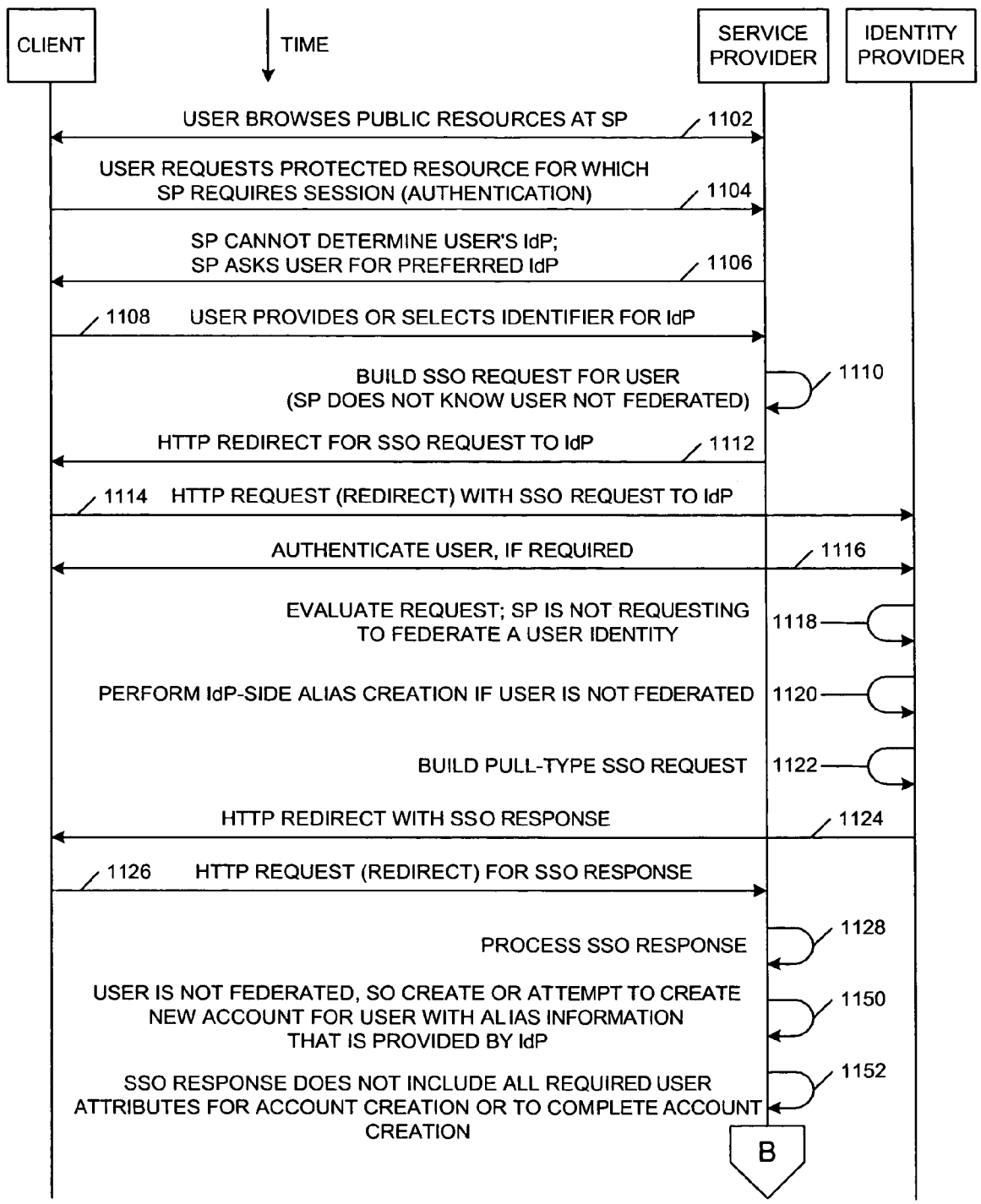
FIGS. 11B-11D depict a set of dataflow diagrams that show an HTTP-redirection-based pull-type single-sign-on operation that is initiated by a federated service provider to allow access to a protected resource at the federated service provider with additional retrieval of user attribute information from a federated identity provider while performing a runtime linked-user-account creation operation at the federated service provider in accordance with an embodiment of the present invention.
Figure 11C:
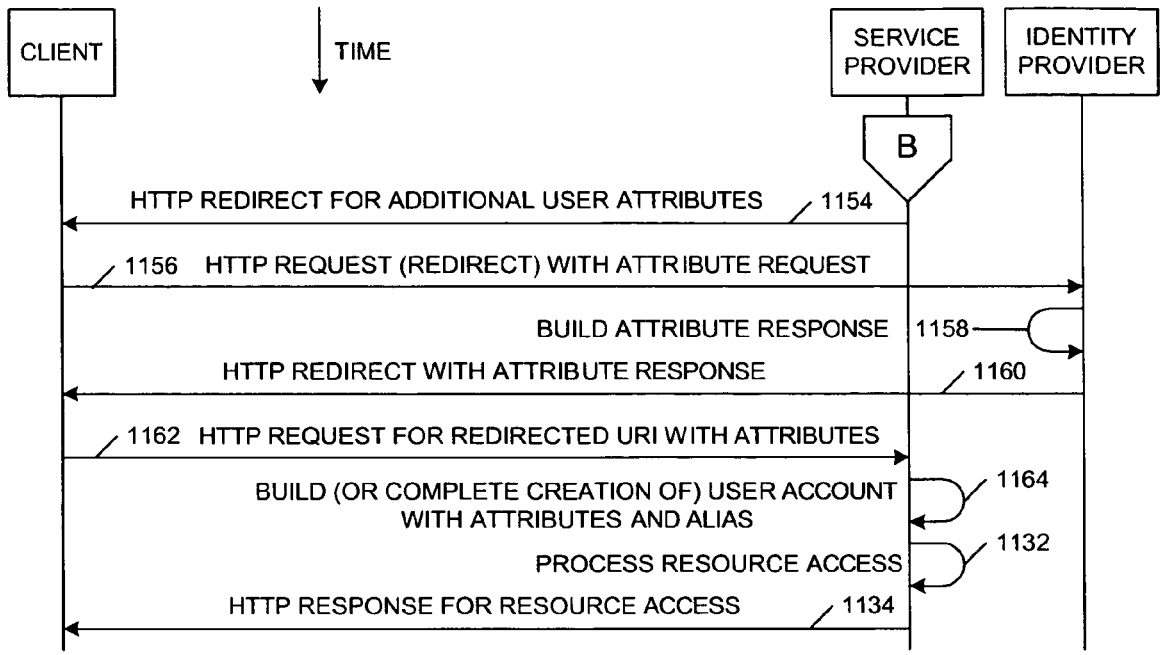
Figure 11D:
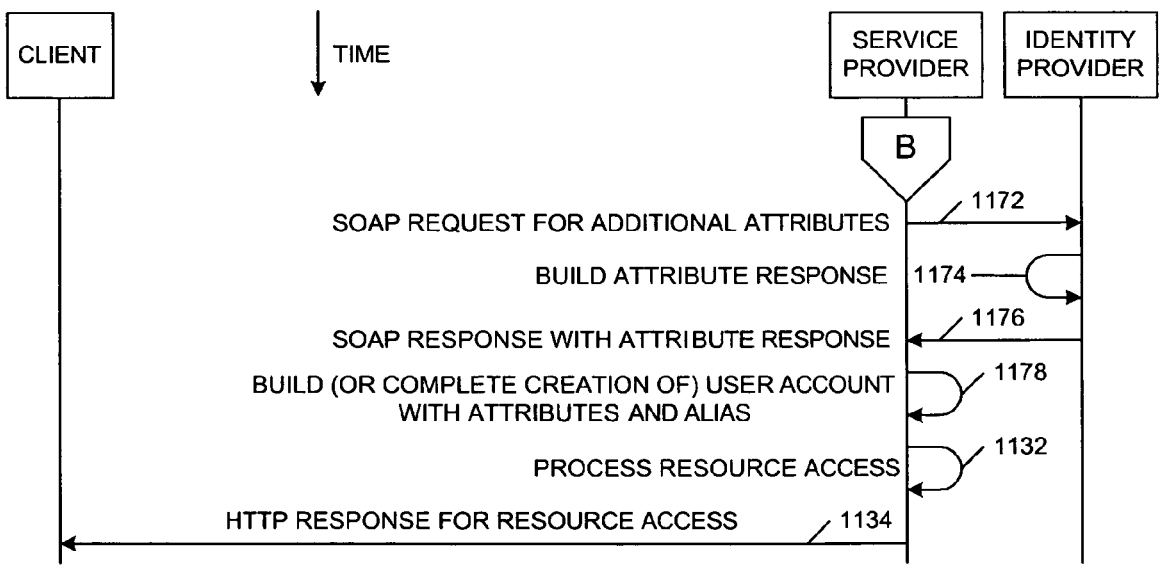

With reference now to FIGS. 11B-11D, a set of dataflow diagrams depict an HTTP-redirection-based pull-type single-sign-on operation that is initiated by a federated service provider to allow access to a protected resource at the federated service provider with additional retrieval of user attribute information from a federated identity provider while performing a runtime linked-user-account creation operation at the federated service provider in accordance with an embodiment of the present invention. In a manner similar to that shown in FIG. 11A, FIG. 11B depicts a process by which a service provider may request a single-sign-on operation at a selected identity provider; similar elements in the figures are identified by similar reference numerals. However, whereas FIG. 11A depicts only a generalized runtime linked-user-account creation operation at step 1130, the process that is shown in FIG. 11B differs from the process that is shown in FIG. 11A with respect to the runtime linked-user-account creation operation, which stretches over steps 1150-1164 in FIGS. 11A-11B.

Referring now to FIG. 11B, unlike the process that is shown in FIG. 11A, the service provider attempts to create a new user account (step 1150) but either is not able to immediately create or is not able to create a fully appropriate user account at the service provider based on the federated user identity information that has been provided by the identity provider to the service provider in the single-sign-on. In other words, depending on the implementation, the service provider either fails to create or determines that it cannot create a user account at this point in time, or the service provider creates a user account with limited-time or limited-access privileges. Hence, the single-sign-on processing in FIG. 11B differs because the service provider recognizes during the single-sign-on operation that the service provider does not yet have a linked user account for the user while also recognizing that the service provider requires additional information about the user from the identity provider (step 1152). More specifically, the service provider does not have, e.g., within its user registries or databases, enough information that allows the service provider to determine the user's appropriate set of privileges; without this information, the service provider cannot determine the type of session/access control rights to give the user.

The manner in which the service provider pulls additional user attribute information from the identity provider to complete the linked-user-account creation operation may vary; two examples of variations are shown over steps 1154-1164 in FIG. 11C or over steps 1172-1178 in FIG. 11D. FIG. 11C illustrates a front-channel attribute retrieval operation, whereas FIG. 11D illustrates a back-channel attribute retrieval operation. Hence, the data flow diagram that is shown in FIG. 11B continues into either FIG. 11C or FIG. 11D; in both cases, the dataflow diagrams in FIG. 11C and FIG. 11D conclude with similar steps. In both FIG. 11C and FIG. 11D, the service provider provides access to the originally requested protected resource at step 1132, and the service provider sends an HTTP Response message to the client that contains information that is derived from accessing the protected resource at step 1134, thereby concluding the process.

Referring now to FIG. 1C, the service provider responds to its determination of its lack of user attribute information by sending an HTTP redirect message (HTTP Response message with status/reason code "302") to the client (step 1154); the message from the service provider contains a request for additional user attribute information. The redirect message redirects the client to the identity provider using a return URI that was previously provided by the identity provider to the service provider. In response to receiving the redirect message from the service provider, the client sends an HTTP Get message to the identity provider as indicated by the URI in the HTTP redirect message from the service provider (step 1156). The identity provider then processes the received message (step 1158) to build a response that contains user attribute information that is stored by the identity provider about the user of the client. The manner in which specific user attributes are identified may vary. For example, the user attribute information that is provided by the identity provider may include user attribute information that was explicitly requested by the service provider. Additionally or alternatively, the user attribute information that is provided by the identity provider may include user attribute information that was implicitly requested by the service provider, i.e. user attribute information that has been determined by the identity provider to be sufficient for performing a linked-user-account creation operation at the service provider. In addition, the identity provider may perform an operation to reconcile the received request for additional user attribute information with the service provider's previous single-sign-on request to ensure that a service provider is not attempting to obtain user attributes without sufficient reason to do so.

After the identity provider builds the message at step 1158, the identity provider sends the message with the additional user attributes to the client (step 1160), e.g., in the form of an HTTP redirect message (HTTP Response message with status/reason code "302"). In response to receiving the redirect message from the identity provider, the client sends an HTTP Get message to the appropriate service at the service provider as indicated by the URI in the HTTP redirect message from the identity provider (step 1162).

Given the additional user attribute information in the received message, the service provider performs or completes a runtime linked-user-account creation operation at the service provider (step 1164) based on the received user attribute information; in this manner, the single-sign-on request can be fulfilled by the service provider, which also creates an active session for the user, and the request for access to the protected resource can proceed at steps 1132 and 1134.

Referring now to FIG. 11D, the service provider responds to its determination of its lack of user attribute information by sending a SOAP message directly from the service provider to the identity provider (step 1172); the message from the service provider contains a request for additional user attribute information. The identity provider then processes the received message (step 1174) to build a response that contains user attribute information that is stored by the identity provider about the user of the client; again, the manner in which specific user attributes are identified may vary as described above. The identity provider sends a SOAP response message with the additional user attributes to the client (step 1176). Given the additional user attribute information in the received message, the service provider performs or completes a runtime linked-user-account creation operation at the service provider (step 1178) based on the received user attribute information; in this manner, the single-sign-on request can be fulfilled by the service provider, which also creates an active session for the user, and the request for access to the protected resource can proceed at steps 1132 and 1134.

CONCLUSION

The advantages of the present invention should be apparent in view of the detailed description of the invention that is provided above. When an identity provider attempts to initiate a single-sign-on operation on behalf of a user at a service provider in order to obtain access to a controlled resource that is hosted by the service provider, it is possible that the service provider would not recognize the user identifier or other user identity information in the received request. In the prior art, this scenario would generate an error.

With the present invention, the service provider may dynamically perform a linked-user-account creation operation as part of the single-sign-on operation. If necessary, the service provider can pull additional user attribute information from the identity provider in order to obtain the required user attributes for the user in a manner that is locally required by the identity management functionality of the service provider.

"It is important to note that while the present invention has been described in the context of a fully functioning data processing system, those of ordinary skill in the art will appreciate that the processes associated with the present invention are capable of being distributed in the form of instructions in a computer readable medium. Examples of computer readable media include media such as EPROM, ROM, tape, paper, floppy disc, hard disk drive, RAM, and CD-ROMs."

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for managing user authentication within a distributed data processing system, wherein a first system and a second system interact within a federated computing environment and support single-sign-on operations in order to provide access to protected resources, at least one of the first system and the second system comprising a processor, the method comprising;
   triggering a single-sign-on operation on behalf of the user in order to obtain access to a protected resource that is hosted by the second system, wherein the second system requires a user account for the user to complete the single-sign-on operation prior to providing access to the protected resource;
   receiving from the first system at the second system an identifier associated with the user; and
   creating a user account for the user at the second system based at least in part on the received identifier associated with the user after triggering the single-sign-on operation but before generating at the second system a response for accessing the protected resource, wherein the created user account supports single-sign-on operations between the first system and the second system on behalf of the user.

2. The method of claim 1 further comprising:
   creating an alias identifier for the user at the first system after triggering the single-sign-on operation.

3. The method of claim 1 further comprising:
   sending a message from the second system to the first system to pull authentication information for the user from the first system to the second system in order to trigger the single-sign-on operation for the user at the second system.

4. The method of claim 1 further comprising:
receiving a message from the first system at the second system to push authentication information for the user from the first system to the second system in order to trigger the single-sign-on operation for the user at the second system.

5. The method of claim 1 further comprising:
in response to a determination at the second system that the second system does not have sufficient user attribute information to complete creation of a user account for the user at the second system, sending a request message from the second system to the first system to retrieve user attribute information; and
receiving at the second system from the first system a response message that contains user attribute information that is employed by the second system to complete creation of a user account for the user at the second system.

6. The method of claim 5 further comprising:
employing a front-channel information retrieval mechanism to obtain user attribute information.

7. The method of claim 6 further comprising:
using HyperText Transport Protocol (HTTP) in the front-channel information retrieval mechanism.

8. The method of claim 5 further comprising:
employing a back-channel information retrieval mechanism to obtain user attribute information.

9. The method of claim 8 further comprising:
using Simple Object Access Protocol (SOAP) in the back-channel information retrieval mechanism.

10. The method of claim 5 further comprising:
performing a preliminary user account creation operation to commence creation of the user account for the user prior to retrieving user attribute information for the user; and
performing a concluding user account creation operation to complete creation of the user account for the user after retrieving user attribute information for the user.

11. The method of claim 5 further comprising:
retrieving user attribute information from a fourth system by the first system.

12. The method of claim 1 wherein the first system supports an identity provider and the second system supports a service provider.

13. The method of claim 12 further comprising:
prompting the user by the service provider to provide or to select an identifier for the identity provider prior to receiving an identifier associated with the user.

14. The method of claim 1 further comprising:
in response to a determination at the second system that the second system does not have sufficient user attribute information to complete creation of a user account for the user at the second system, sending a request message to a fourth system to retrieve user attribute information; and
receiving at the second system from the fourth system a response message that contains user attribute information that is employed by the second system to complete creation of a user account for the user at the second system.

15. A computer program product on a computer-readable medium for managing user authentication within a data processing system, wherein a first system and a second system interact within a federated computing environment and support single-sign-on operations in order to provide access to protected resources, at least one of the first system and the second system comprising a processor, the computer program product holding computer program instructions which when executed by the data processing system perform a method comprising:
triggering a single-sign-on operation on behalf of the user in order to obtain access to a protected resource that is hosted by the second system, wherein the second system requires a user account for the user to complete the single-sign-on operation prior to providing access to the protected resource;
receiving from the first system at the second system an identifier associated with the user; and
creating a user account for the user at the second system based at least in part on the received identifier associated with the user after triggering the single-sign-on operation but before generating at the second system a response for accessing the protected resource, wherein the created user account supports single-sign-on operations between the first system and the second system on behalf of the user.

16. The computer program product of claim 15 wherein the method further comprises:
creating an alias identifier for the user at the first system after triggering the single-sign-on operation.

17. The computer program product of claim 15 wherein the method further comprises:
sending a request message from the second system to the first system to retrieve user attribute information in response to a determination at the second system that the second system does not have sufficient user attribute information to complete creation of a user account for the user at the second system; and
receiving at the second system from the first system a response message that contains user attribute information that is employed by the second system to complete creation of a user account for the user at the second system.

18. An apparatus for managing user authentication within a data processing system, wherein a first system and a second system interact within a federated computing environment and support single-sign-on operations in order to provide access to protected resources, at least one of the first system and the second system comprising a processor, the apparatus comprising:
a processor;
a computer memory holding computer program instructions which when executed by the processor perform a method comprising:
triggering a single-sign-on operation on behalf of the user in order to obtain access to a protected resource that is hosted by the second system, wherein the second system requires a user account for the user to complete the single-sign-on operation prior to providing access to the protected resource;
receiving from the first system at the second system an identifier associated with the user; and
creating a user account for the user at the second system based at least in part on the received identifier associated with the user after triggering the single-sign-on operation but before generating at the second system a response for accessing the protected resource, wherein the created user account supports single-sign-on operations between the first system and the second system on behalf of the user.

19. The apparatus of claim 18 wherein the method further comprises:

creating an alias identifier for the user at the first system after triggering the single-sign-on operation.

20. The apparatus of claim 18 wherein the method further comprises:

sending a request message from the second system to the first system to retrieve user attribute information in response to a determination at the second system that the second system does not have sufficient user attribute information to complete creation of a user account for the user at the second system; and receiving at the second system from the first system a response message that contains user attribute information that is employed by the second system to complete creation of a user account for the user at the second system.

* * * * *

UNITED STATES PATENT AND TRADEMARK OFFICE
CERTIFICATE OF CORRECTION

PATENT NO. : 7,631,346 B2　　　　　　　　　　　　　　　　　　　　　　Page 1 of 1
APPLICATION NO. : 11/097587
DATED : December 8, 2009
INVENTOR(S) : Hinton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1217 days.

Signed and Sealed this

Twenty-first Day of December, 2010

David J. Kappos
*Director of the United States Patent and Trademark Office*